US012790430B2

(12) United States Patent
Auyeung et al.

(10) Patent No.: US 12,790,430 B2
(45) Date of Patent: Nov. 10, 2026

(54) SINGLE REACTOR CHAIN SHUTTLING REACTIONS FOR ETHYLENE/VINYLARENE MULTIBLOCK INTERPOLYMERS

(71) Applicants: Dow Global Technologies LLC, Midland, MI (US); Northwestern University, Evanston, IL (US)

(72) Inventors: Evelyn Auyeung, Lake Jackson, TX (US); Rhett A. Baillie, Lake Jackson, TX (US); Thomas Wesley Karjala, Jr., Lake Jackson, TX (US); Zhe Zhou, Lake Jackson, TX (US); Jeffrey C. Munro, Lake Jackson, TX (US); Colin Li Pi Shan, Lake Jackson, TX (US); Phillip D. Hustad, St. Paul, MN (US); Tobin J. Marks, Evanston, IL (US); Yanshan Gao, Evanston, IL (US)

(73) Assignees: Dow Global Technologies LLC, Midland, MI (US); Northwestern University, Evanston, IL (US)

( * ) Notice: Subject to any disclaimer, the term of this patent is extended or adjusted under 35 U.S.C. 154(b) by 619 days.

(21) Appl. No.: 18/254,956

(22) PCT Filed: Dec. 16, 2021

(86) PCT No.: PCT/US2021/063913

§ 371 (c)(1),
(2) Date: May 30, 2023

(87) PCT Pub. No.: WO2022/133142

PCT Pub. Date: Jun. 23, 2022

(65) Prior Publication Data

US 2024/0010779 A1 Jan. 11, 2024

Related U.S. Application Data

(60) Provisional application No. 63/127,343, filed on Dec. 18, 2020.

(51) Int. Cl.
*C08F 297/08* (2006.01)

(52) U.S. Cl.
CPC ................................ *C08F 297/083* (2013.01)

(58) Field of Classification Search
CPC ................ C08F 297/083; C08F 210/02; C08F 212/08; C08F 297/086
See application file for complete search history.

(56) References Cited

U.S. PATENT DOCUMENTS

| | | | | |
|---|---|---|---|---|
| 8,461,270 | B2 | 6/2013 | Ishihara et al. | |
| 8,623,976 | B2 | 1/2014 | Hou et al. | |
| 2007/0167578 | A1* | 7/2007 | Arriola ................. | C08F 210/16 525/242 |
| 2014/0088276 | A1 | 3/2014 | Hou et al. | |
| 2018/0022852 | A1 | 1/2018 | Lee et al. | |

FOREIGN PATENT DOCUMENTS

| | | | |
|---|---|---|---|
| EP | 2708562 | A1 | 3/2014 |
| JP | 2010-059309 | A | 3/2010 |
| WO | 2018/170248 | A1 | 9/2018 |

OTHER PUBLICATIONS

Kim, RSC Adv., 2017, 7, p. 5948-5956. (Year: 2017).*
Hagihara, Polymer Journal (2012) 44, 147-154 (Year: 2012).*
Liu, Polym. Chem. 2019, 10, 235-243 (Year: 2019).*
Peng, Chinese J. Polym. Sci. 2018, 36, 222-230 (Year: 2018).*
Mastan, Macromolecules, 2017, 50, 9173-9187 (Year: 2017).*
Andrei Valente et al, Coordinative Chain Transfer Polymerization, Chemical Reviews, May 8, 2013, pp. 3836-3857, vol. 113.
Hideaki Hagihara et al, Synthesis of Ethylene-Styrene Copolymer Containing Syndiotactic Polystyrene Sequence by Trivalent Titanium Catalys, Polymer Journal, Nov. 16, 2011, pp. 147-154, vol. 44
Andrei Valente et al, Iso-Styrene Chain Shuttline Copolymerization Mediated by a Lanthanide Half-Sandwich Complex and a Lnthanidocene: Straightforward Access to a New Type of Thermoplastic Elastomers, Angewandte Chemie International Edition, Dec. 23, 2013, pp. 4638-4641, vol. 53.
Li Pan et al, Chain-Shuttline Polymerization at Two Different Scandium Sites: Regio- and Stereospecific "One-Pot" Block Copolymerization of Styrene, Isoprene, and Butadiene, Angewandte Chemie International Edition, Oct. 25, 2010, pp. 12012-12015, vol. 50.
Seung Soo Park, Biaxial Chain Growth of Polyolefin and Polystyrene from 1, 6-Hexanediylzinc Species for Triblock Copolymers, Macromolecules, Aug. 21, 2017, pp. 6606-6616, vol. 50.
Yunjie Luo et al, Scandium Half-Metallocene-Catalyzed Syndiospecific Styrene Polymerization and Styrene-Ethlene Copolymerization: Unprecidented Incorporation of Syndiotactic Styrene-Styrene Sequences in Styrene-Ethylene Copolymers, Journal of the American Chemical Society, Oct. 12, 2004, pp. 13910-13911, vol. 126.

(Continued)

*Primary Examiner* — Robert C Boyle
(74) *Attorney, Agent, or Firm* — Boyle Fredrickson S.C.

(57) ABSTRACT

A process to form a composition comprising an ethylene/vinylarene multiblock interpolymer, said process comprising polymerizing, in a single reactor, a mixture comprising ethylene, a vinylarene, and optionally an alpha-olefin, in the presence of at least the following a)-c): a) a first metal complex selected from the following Formula (A), as described herein: b) a second metal complex selected from the following Formula (B), as described herein, and c) a chain shuttling agent selected from the following: a dialkyl zinc, a trialkyl aluminum, or a combination thereof. A composition comprising an ethylene/vinylarene multiblock interpolymer comprising at least one polymer structure selected from: -(AR)-(AP)-(AR)-(AP)- (Structure 1), or (AR)-(AP)-(AR)-(AP) (Structure 2); where each (AR) segment independently comprises, in polymerized form, ethylene, >10 mol % of the vinylarene and optionally an alpha-olefin, and wherein each (AP) segment independently comprises, ethylene, optionally ≤10 mol % vinylarene and optionally the alpha-olefin.

7 Claims, 5 Drawing Sheets

(56) References Cited

OTHER PUBLICATIONS

Fei Lin et al, Synthesis and Characterization of Crystalline Styrene-b-(Ethylene-co-Butylene)-b-Styrene Triblock Copolymers, Journal of Polymer Science Part A: Polymer Chemistry, Feb. 24, 2017, pp. 1243-1249, vol. 55, issue 7.

* cited by examiner

SINGLE REACTOR CHAIN SHUTTLING REACTIONS FOR ETHYLENE/VINYLARENE MULTIBLOCK INTERPOLYMERS

CROSS-REFERENCE TO RELATED APPLICATIONS

The present application claims the benefit of priority to U.S. Provisional Application No. 63/127,343, filed on Dec. 18, 2020, which is incorporated herein by reference in its entirety.

BACKGROUND OF THE INVENTION

The catalytic production of olefin block copolymers (OBC) via chain shuttling technology has resulted in differentiated materials, such as the INFUSE™ Olefin Block Copolymers and the INTUNE™ Olefin Block Copolymers. There is a need for chain shuttling technology to produce other types of polymers, such as stereo-controlled ethylene/vinylarene block interpolymers, using single reactor, continuous solution polymerizations.

A. Valente et al., Angew. Chem., Int. Ed. 2014, 53, 4638-4641, *Isoprene-Styrene Chain Shuttling Copolymerization Mediated by a Lanthanide Half-Sandwich Complex and a Lanthanidocene: Straightforward Access to a New Type of Thermoplastic Elastomers*, discloses an isoprene and styrene chain shuttling polymerization using n-butylethylmagnesium, a lanthanide half-sandwich complex and a lanthanidocene. The resulting multiblock structures have hard (styrene-rich) and soft (isoprene-rich) segments.

U.S. Publication 2014/0088276 (Manufacturing Method for Multidimensional Polymer, and Multidimensional Polymer) discloses the polymerization of stereo-controlled (syndiotactic) block copolymers of a styrene-type monomer with a conjugated diene, such as isoprene or butadiene, by chain shuttling technology and coordinative chain transfer polymerization. The polymerization takes place in the presence of a first catalyst and a second catalyst. Each of the first catalyst and the second catalyst, independently, contain the following: a) a group 3 metal atom or a lanthanoid metal atom, and for example, Sc, b) a Cp* ligand containing a substituted or unsubstituted cyclopentadienyl derivative, c) monoanion ligand, and d) a neutral Lewis base.

U.S. Pat. No. 8,623,976 (Polymerization Catalyst Compositions Containing Metallocene Complexes and the Polymers Produced by Using the Same) discloses a catalyst composition comprising the following: a) metallocene complex containing the following:

i) a group 3 metal atom or a lanthanoid metal atom, and for example, Sc,
ii) a Cp* ligand of a substituted or unsubstituted cyclopentadienyl derivative.
iii) monoanionic ligands.
iv) a neutral Lewis base;

b) an ionic compound of a non-ligand anion and a cation, and for example, tetrakis(pentafluoro-phenyl)borate. The catalyst composition is used to polymerize various polymers, such as ethylene/styrene copolymers (see Examples 11-17). The polymerized styrene may be in syndiotactic form.

L. Pan et al., Angew. Chem., Int. Ed. 2011, 50, 12012-12015, *Chain-Shuttling Polymerization at Two Different Scandium Sites: Regio- and Stereospecific "One-Pot" Block Copolymerization of Styrene, Isoprene, and Butadiene*, discloses the chain-shuttling polymerization of styrene, isoprene and butadiene, by two different scandium catalysts and a chain shuttling agent (TIBA). The polymerization results in the regio and stereospecific copolymerization of styrene, isoprene and butadiene.

S. S. Park et al., Macromolecules 2017, 50, 6606-6616, *Biaxial Chain Growth of Polyolefin and Polystyrene from 1,6-Hexanediylzinc Species for Triblock Copolymers*, discloses the preparation of triblock copolymers, by initiating (anionic) styrene polymerization from a polymeryl zincate species. A polyethylene/polypropylene copolymer is grown from a dual-headed zinc species using coordinative chain transfer polymerization, followed by addition of the anionic initiator (for example, $Me_3SiCH_2Li$-(pmdeta)) and styrene monomer. The coordinative chain transfer polymerization takes place in the presence of a transition metal (for example, Zr or Hf) complex. The anionic polymerization is used to grow polystyrene end blocks that do not exhibit any stereoregularity.

U.S. Publication 2018/0022852 (Organic Zine Compound Comprising Polyolefin-Polystyrene Block Copolymer, and Method for Preparing the Same) discloses the preparation of an organic zinc compound, such as that of Formula 1, as shown therein, and which comprises a styrene-based polymer or a polyolefin-polystyrene block copolymer. This preparation method comprises preparing an intermediate, by coordination polymerizing an olefin monomer using a transition metal catalyst, and then inserting, in part, styrene monomers into the intermediate by anionic polymerization. Transition metal catalysts include Zr metal compounds represented by Formula 6A and Formula 6B, each shown therein (see paragraphs [0076] and [00771]).

Y. Luo et al., J. Am. Chem. Soc. 2004, 126, 13910-13911, *Scandium Half-Metallocene-Catalyzed Syndiospecific Styrene Polymerization and Styrene-Ethylene Copolymerization: Unprecedented Incorporation of Syndiotactic Styrene-Styrene Sequences in Styrene-Ethylene Copolymers*, discloses the polymerization of syndiospecific styrene-ethylene copolymers, using a scandium half-sandwich complex. The melting temperature ($T_m$) of the copolymer can be modified by adjusting the ethylene incorporation, where ethylene incorporation results in a decrease in the $T_m$. No chain-shuttling was demonstrated with the Sc catalyst.

H. Hagihara et al., Polymer Journal 2012, 44, 147-154, *Synthesis of Ethylene-Styrene Copolymer Containing Syndiotactic Polystyrene Sequence by Trivalent Titanium Catalyst*, discloses the polymerization of syndiotactic styrene-ethylene copolymers, using a trivalent titanium catalyst, tris(acetylacetonate) titanium ($Ti(acac)_3$). Different polymers were produced by the $Ti(acac)_3$ catalyst, which may be attributed to the presence of multiple oxidation states on this catalyst.

F. Lin et al., Journal of Polymer Science. Part A: Polymer Chemistry 2017, 55, 1243-1249, *Synthesis and Characterization of Crystalline Styrene-b-(Ethylene-co-Butylene)-b-Styrene Triblock Copolymers*, discloses the synthesis and characterization of crystalline styrene-b-(ethylene-co-butylene)-b-styrene (SEBS). The cationic, rare earth metal complex, $[(\eta^5\text{-Flu-CH}_2\text{-Py})Ho(CH_2SiMe_3)](THF)$, was used for a living polymerization of butadiene and styrene. The sequential addition of styrene, butadiene and styrene monomers formed an SBS triblock. The SBS triblock consisted of elastic polybutadiene sequences with 1,4 regularity and crystalline syndiotactic polystyrene. The SBS triblock was hydrogenated to form the SEBS.

B. Liu et al., Macromolecules 2016, 49, 6226-6231, *Regioselective Chain Shuttling Polymerization of Isoprene: An Approach to Access New Materials from Single Monomer*, discloses the chain transfer polymerization of isoprene using a pyridyl-methylene fluorenyl scandium complex, in combination with $[Ph_3C]B(C_6F_5)_4$ and $iBu_3Al$. The polymerization yielded high 1,4-selectivity of the isoprene, Additional catalysts structures include "pyridyl-methylene functionalized fluorenyl ligated rare earth metal complexes 1-9, as shown therein, and where the metal is Sc, Y, Lu, Tm, Er, Ho, Dy, Tb or Gd (see page 6227 (Chart 1)).

U.S. Pat. No. 8,710,143 (Catalyst Composition Comprising Shuttling Agent for Ethylene Multi-Block Copolymer Formation) discloses the polymerization of multiblock copolymers using the following: (A) a first metal complex olefin polymerization catalyst, (B) a second metal complex olefin polymerization catalyst capable of preparing polymers differing in chemical or physical properties from the polymer prepared by catalyst (A), under equivalent polymerization conditions, and (C) a chain shuttling agent. Suitable monomers include ethylene and one or more addition polymerizable monomers, such as 1-octene and styrene (see column 16, lines 3-32). Suitable catalysts include metal complexes, where the metal is selected from Group 3-15, preferably Groups 3-10, more preferably Groups 4-8, and most preferably Group 4 (Ti, Zr and Hf). See, for example, column 19, line 61, to column 20, line 6. An ethylene/styrene multiblock polymer was prepared using CAT A1 (Hf) and CAT B1 (Zr), each as shown therein (see column 85, lines 12-30; column 86, lines 21-52; column 115, line 21, to column 116, line 23 and Tables 27 and 28).

Additional olefin block copolymers (OBCs) and associated polymerizations are disclose in the following references: U.S. Pat. Nos. 7,915,192; 8,124,709; 8,501,885; 8,716,400; EP1716190B1; EP1926763B1; and EP2582747B1.

However, there remains a need for stereo controlled ethylene/vinylarene multiblock interpolymers, and a need for their preparation using single reactor, continuous solution polymerizations. These needs have been met by the following invention.

SUMMARY OF THE INVENTION

In a first aspect, a process to form a composition comprising an ethylene/vinylarene multiblock interpolymer, said process comprising polymerizing, in a single reactor, a mixture comprising ethylene, a vinylarene, and optionally an alpha-olefin, in the presence of at least the following components a)-c):

a) a first metal complex selected from the following Formula A:

(Formula A)

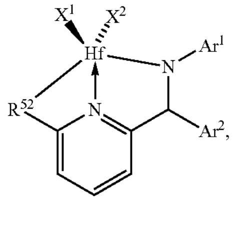

wherein $X^1$ and $X^2$ are each independently selected from a substituted or unsubstituted ($C_1$-$C_{30}$) hydrocarbyl, a substituted or unsubstituted ($C_1$-$C_{30}$) heterohydrocarbyl; and wherein $X^1$ and $X^2$ may optionally be linked;

$Ar^1$ and $Ar^2$ are each, independently, a substituted or unsubstituted aryl or a substituted or unsubstituted heteroaryl group, $R^{52}$ is a substituted or unsubstituted arylene group;

b) a second metal complex selected from the following Formula B:

(Formula B)

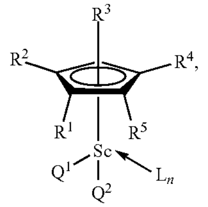

wherein $R^1$, $R^2$, $R^3$, $R^4$, and $R^5$ are each independently H, a substituted or unsubstituted hydrocarbyl group, or a substituted or unsubstituted heterohydrocarbyl group;

$Q^1$ and $Q^2$ are each independently a substituted or unsubstituted hydrocarbyl group, a substituted or unsubstituted heterohydrocarbyl group, or a halogen; and L is a Lewis base; each n is independently 0 or 1; and wherein optionally at least one L group and at least one Q group are connected, and optionally at least one R group and at least one Q group are connected;

c) a chain shuttling agent selected from the following: a dialkyl zinc, a trialkyl aluminum, or a combination thereof.

In a second aspect, a composition comprising an ethylene/vinylarene multiblock interpolymer, said interpolymer comprising at least one polymer structure selected from Structure 1 or Structure 2, each as shown below, and where (AR) refers to a vinylarene rich segment and (AP) refers to a vinylarene poor segment:

-(AR)-(AP)-(AR)-(AP)- (Structure 1), (AR)-(AP)-(AR)-(AP) (Structure 2), wherein each (AR) segment independently comprises, in polymerized form, ethylene, the vinylarene and optionally an alpha-olefin; and wherein each (AP) segment independently comprises, in polymerized form, ethylene, optionally the vinylarene and optionally the alpha-olefin; and wherein each (AR) segment independently comprises, in polymerized form, >10 mol % of the vinylarene, based on the total moles of polymerized monomers in the (AR) segment; and wherein each (AP) segment independently comprises, in polymerized form, ≤10 mol % of the vinylarene, based on the total moles of polymerized monomers in the (AP) segment.

DETAILED DESCRIPTION OF THE INVENTION

Figure 1:
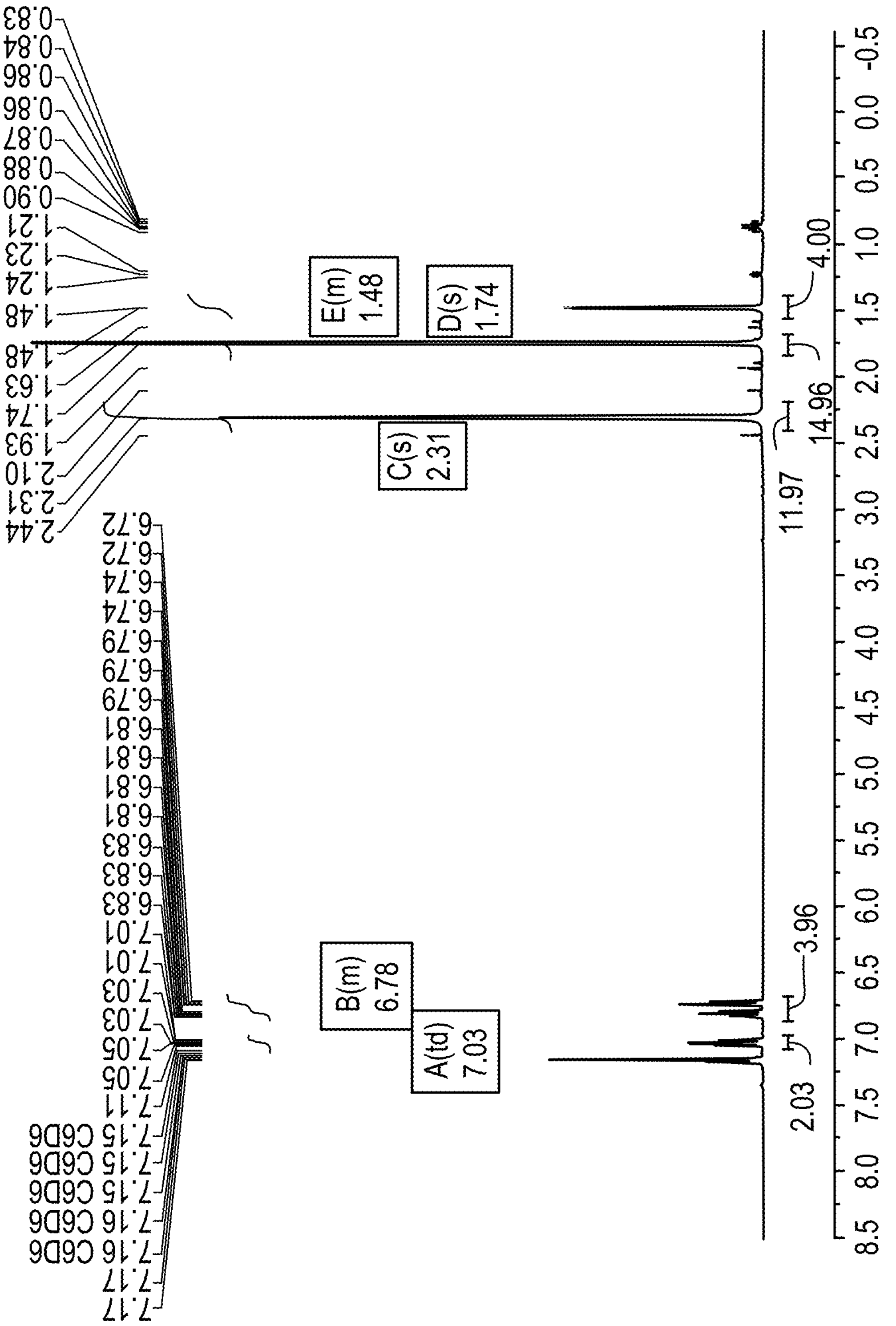
FIG. 1 depicts the $^1H$ NMR profile of CAT B.

Chain shuttling technology has been discovered to produce ethylene/vinylarene multiblock interpolymers, via dual catalysts in a single reactor. One catalyst produces a vinylarene-poor segment (AP, soft block), while the other catalyst produces a vinylarene-rich segment (AR, hard block). Addition of an Al- or Zn-based chain-shuttling agent (CSA), in the presence of both catalysts, produce a composition comprising an ethylene/vinylarene multiblock interpolymer. It has been discovered that individual block properties can be adjusted through the selection of a compatible catalyst pair, monomers, chain-shuttling agent, and polymerization conditions.

It has also been discovered that the catalyst used to produce the vinylarene-poor segments had the following properties: a) produced polymers with high native molecular weights; b) had high chain shuttling constants, as determined by molecular weight reduction and narrowing of the molecular weight distribution in the presence of a CSA; c) had high alpha-olefin incorporation: d) had low vinylarene (for example, styrene) incorporation, such that the $T_g$ was similar to an ethylene-based interpolymer containing similar alpha-olefin incorporation, but no styrene incorporation; and e) produced polymers with low crystallinity.

It was discovered that the catalyst used to produce the vinylarene-rich segments had the following properties: a) had high vinylarene (for example, styrene) incorporation; b) had high "back-to-back" vinylarene insertion to generate a syndiotactic configuration; c) had high chain shuttling constants, as determined by molecular weight reduction and narrowing of the molecular weight distribution in the presence of a CSA; d) had high activity in the presence of ethylene; and e) had low alpha-olefin incorporation.

As discussed above, in a first aspect, the invention provides a process to form a composition as discussed above. The inventive process may comprise a combination of two or more embodiments described herein. Each component a, b and c may each independently comprise a combination of two or more embodiments described herein.

As discussed above, in a second aspect, the invention provides a composition as discussed above. The inventive composition may comprise a combination of two or more embodiments described herein. Structure 1 and Structure 2 may each independently comprise a combination of two or more embodiments described herein.

Note, as used herein, in reference to structures of a metal complex, $X^1$=X1, $X^2$=X2, and Ar1=$Ar^1$, Ar2=$Ar^2$, Ar3=$Ar^3$, and so forth. Also, as used herein, in reference to such structures, R1=$R^1$, R2=$R^2$, R3=$R^3$, and so forth. The notation $R^a$-$R^n$, where "a through n" represents consecutive numbers, refers to $R^a$, $R^{a+1}$, $R^{a+2}$, . . . , $R^n$. For example, $R^3$-$R^7$ refers to $R^3$, $R^4$, $R^5$, $R^6$, $R^7$.

The following embodiments apply to an inventive process.

In one embodiment, or a combination of two or more embodiments, each described herein, Formula A is selected from the following structures (a11) or (a12):

(a11)

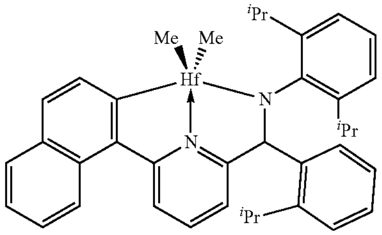

or (a12)

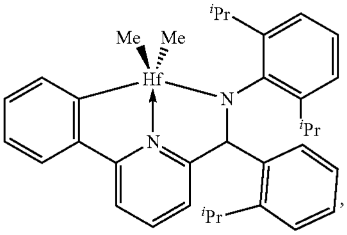

, and further from structure (a11).

In one embodiment, or a combination of two or more embodiments, each described herein, Formula B is selected from the following structures (b11) or (b12):

(b11)

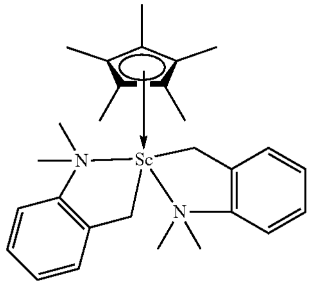

or (b12)

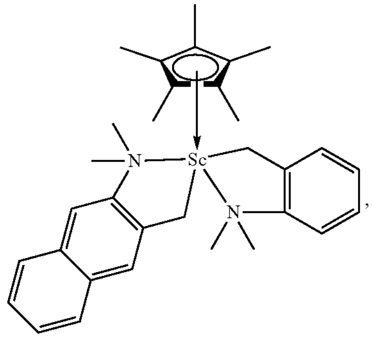

, and further from structure (b11).

In one embodiment, or a combination of two or more embodiments, each described herein, the chain shuttling agent (component c) is selected from the following: $Zn(CH_2CH_3)_2$, $Al(CH_2CH_3)_3$, or a combination thereof.

In one embodiment, or a combination of two or more embodiments, each described herein, wherein the mixture comprises the alpha-olefin.

The invention also provides a composition formed from an inventive process of one or more embodiments described herein.

The following embodiments apply to an inventive process or an inventive composition.

In one embodiment, or a combination of two or more embodiments, each described herein, for the ethylene/vinylarene multiblock interpolymer, each (AR) segment independently comprises, in polymerized form, ≥15 mol %, or ≥20 mol %, or ≥25 mol %, or ≥30 mol %, or ≥35 mol %, or ≥40 mol %, or ≥45 mol %, or ≥50 mol %, or ≥55 mol %, or ≥60 mol %, of the vinylarene, based on the total moles of polymerized monomers in the (AR) segment. In one embodiment, or a combination of two or more embodiments, each described herein, each (AR) segment independently comprises, in polymerized form, <100 mol %, or ≤98 mol %, or ≤96 mol %, or ≤94 mol %, or ≤92 mol %, or ≤91 mol % of the vinylarene, based on the total moles of polymerized monomers in the (AR) segment.

In one embodiment, or a combination of two or more embodiments, each described herein, for the ethylene/vinylarene multiblock interpolymer, each (AR) segment independently comprises, in polymerized form, ≥2.0 mol %, or ≥4.0 mol %, or ≥6.0 mol %, or ≥8.0 mol %, or ≥9.0 mol %, or ≥10 mol %, or 11 mol %, or ≥12 mol %, or ≥13 mol %, or ≥14 mol % of ethylene, based on the total moles of polymerized monomers in the (AR) segment. In one embodiment, or a combination of two or more embodiments, each described herein, each (AR) segment independently comprises, in polymerized form, ≤80 mol %, or ≤77 mol %, or ≤75 mol %, or ≤73 mol %, or ≥70 mol %, or ≤65 mol %, or ≤60 mol %, or ≤55 mol %, or ≤50 mol %, or ≤45 mol %, or ≤40 mol % of ethylene, based on the total moles of polymerized monomers in the (AR) segment.

In one embodiment, or a combination of two or more embodiments, each described herein, for the ethylene/vinylarene multiblock interpolymer, each (AR) segment independently comprises ≥20 mol % or ≥30 mol %, or ≥40 mol %, or ≥50 mol % or ≥60 mol %, or ≥70 mol %, or ≥80 mol % or ≥85 mol %, or ≥90 mol %, or ≥92 mol %, or ≥94 mol %, or ≥96 mol %, or ≥98 mol %, or ≥99 mol % of the polymerized vinylarene in a "back to back" configuration, as shown below in subsegment bb:

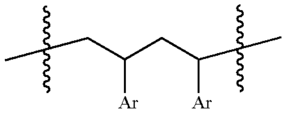;

(subsegment bb)

and wherein the mol % is based on the total moles of polymerized vinylarene in the (AR) segment. In one embodiment, or a combination of two or more embodiments, each described herein, each (AR) segment independently comprises ≤100 mol % of the polymerized vinylarene in a "back to back" configuration, as shown in subsegment bb above.

In one embodiment, or a combination of two or more embodiments, each described herein, for the ethylene/vinylarene multiblock interpolymer, each (AR) segment independently comprises ≥20 mol % or ≥30 mol %, or ≥40 mol %, or ≥50 mol % or ≥60 mol %, or ≥70 mol %, or ≥80 mol %, or ≥85 mol %, or ≥90 mol %, or ≥92 mol %, or ≥94 mol %, or ≥96 mol %, or ≥98 mol %, or ≥99 mol % of the polymerized vinylarene in a syndiotactic "back to back" configuration, as shown below in subsegment sbb:

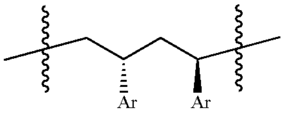;

(subsegment sbb)

and wherein the mol % is based on the total moles of polymerized vinylarene in the (AR) segment. In one embodiment, or a combination of two or more embodiments, each described herein, each (AR) segment independently comprises ≤100 mol % of the polymerized vinylarene in a "back to back" configuration, as shown in subsegment sbb above.

In one embodiment, or a combination of two or more embodiments, each described herein, for the ethylene/vinylarene multiblock interpolymer, the vinylarene is styrene.

In one embodiment, or a combination of two or more embodiments, each described herein, the ethylene/vinylarene multiblock interpolymer is an ethylene/alpha-olefin/vinylarene multiblock interpolymer, and further an ethylene/alpha-olefin/vinylarene multiblock terpolymer.

In one embodiment, or a combination of two or more embodiments, each described herein, the composition further comprises a polyethylene homopolymer, an ethylene/vinylarene copolymer, an ethylene/alpha-olefin copolymer, or a combination thereof.

Also provided is an article comprising at least one component formed from the composition of one or more embodiments described herein.

Vinylarene Monomers

Vinylarene monomers are aromatic monomers, and include, but are not limited to, aromatic vinyl compounds such as mono- or poly-alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as, o-chlorostyrene, m-chlorostyrene, p-chlorostyrene, divinylbenzene, 3-phenylpropene, 4-phenylpropene and a-methylstyrene, provided the monomer is polymerizable under the conditions employed.

Chain Shuttling Agent (CSA)

The term, "chain shuttling agent (CSA)" refers to a compound or a mixture of compounds that is capable of causing a polymeryl exchange between at least two active catalyst sites of the catalysts included in the conditions of the polymerization. That is, transfer of a polymer fragment occurs both to, and from, one or more of the active catalyst sites. The CSA is able to chain transfer between, for example, the "AP (soft block) catalyst" and the "AR (hard block) catalyst." Suitable chain shuttling agents include, but are not limited to, trialkylaluminum and dialkyl zinc compounds, especially triethylaluminum, tri(isopropyl)aluminum, tri(isobutyl)aluminum, tri(n-hexyl)aluminum, tri(n-octyl)aluminum, and diethylzinc.

Ethylene/Vinylarene Multiblock Interpolymers

Ethylene/vinylarene multiblock interpolymers are characterized by multiple (four or more) blocks or segments of two or more polymerized monomer units, and which blocks differ in chemical or physical properties. Preferably the segments are linked in a substantially linear fashion, as opposed to a substantially branched or substantially star-shaped fashion. In other embodiments, each block is randomly distributed along the polymer chain. As discussed, the ethylene/vinylarene multiblock interpolymers comprise two chemically distinct regions (referred to as "blocks"), preferably joined in a linear manner. In an embodiment, the blocks differ in the amount or type of incorporated comonomer, density, amount of crystallinity, type or degree of tacticity (isotactic or syndiotactic), or any other chemical or physical property. Compared to conventional block interpolymers of the art, including interpolymers produced by sequential monomer addition, fluxional catalysts, or anionic polymerization techniques, the present ethylene/vinylarene multiblock interpolymers are characterized by unique distributions of both polymer polydispersity (PDI or $M_w/M_n$ or MWD), block length distribution, and/or block number distribution, due to the effect of the shuttling agent(s) in combination with multiple catalysts used in their preparation.

Definitions

Unless stated to the contrary, implicit from the context, or customary in the art, all parts and percentages are based on weight, and all test methods are current as of the filing date of this disclosure.

The term "composition." as used herein, includes a mixture of materials, which comprise the composition, as well as reaction byproducts and decomposition products formed from the materials of the composition. Any reaction byproduct or decomposition product is typically present in trace or residual amounts.

The term "polymer," as used herein, refers to a polymeric compound prepared by polymerizing monomers, whether of the same or a different type. The generic term polymer thus includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers.

The term "interpolymer," as used herein, refers to a polymer prepared by the polymerization of at least two different types of monomers. The term interpolymer thus includes the term copolymer (employed to refer to polymers prepared from two different types of monomers) and polymers prepared from more than two different types of monomers.

The term "olefin-based polymer," as used herein, refers to a polymer that comprises, in polymerized form, 50 wt % or a majority weight percent of an olefin, such as ethylene or propylene (based on the weight of the polymer), and optionally may comprise one or more comonomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "vinylarene-based polymer." as used herein, refers to a polymer that comprises, in polymerized form, a majority weight percent of the vinylarene (based on the weight of the polymer), and optionally may comprise one or more comonomers.

The term "styrene-based polymer," as used herein, refers to a polymer that comprises, in polymerized form, a majority weight percent of styrene (based on the weight of the polymer), and optionally may comprise one or more comonomers.

The term "ethylene/alpha-olefin interpolymer," as used herein, refers to a random interpolymer that comprises, in polymerized form, 50 wt % or a majority weight percent of ethylene (based on the weight of the interpolymer), and an alpha-olefin.

The term, "ethylene/alpha-olefin copolymer," as used herein, refers to a random copolymer that comprises, in polymerized form, 50 wt % or a majority weight percent of ethylene (based on the weight of the copolymer), and an alpha-olefin, as the only two monomer types.

The term, "ethylene/vinylarene copolymer," as used herein, refers to a random copolymer that comprises, in polymerized form, 50 wt % or a majority weight percent of ethylene (based on the weight of the copolymer), and a vinylarene, as the only two monomer types.

The phrase "a majority weight percent." as used herein, in reference to a polymer (or interpolymer, or terpolymer or copolymer), refers to the amount of monomer present in the greatest amount in the polymer.

The term "ethylene/vinylarene multiblock interpolymer," as used herein, refers to a multiblock interpolymer that comprises at least two vinylarene-rich (AR) segments and at least two vinylarene-poor (AP) segments. Each (AR) segment independently comprises, in polymerized form, >10 mol % of the vinylarene. Each (AP) segment independently comprises, in polymerized form, ≤10 mol % of the vinylarene. Each mol % is based on the total moles of polymerized monomers in the respective segment. The multiblock interpolymer comprises, in polymerized form, ethylene, the vinylarene, and may comprise other monomer types. The term "ethylene/vinylarene multiblock copolymer." as used herein, refers to a multiblock copolymer that comprises at least two vinylarene-rich (AR) segments, as discussed above, and at least two vinylarene-poor (AP) segments, as discussed above. The multiblock copolymer comprises, in polymerized form, ethylene and the vinylarene, as the only two monomer types.

The term "ethylene/alpha-olefin/vinylarene multiblock interpolymer," as used herein, refers to a multiblock interpolymer that comprises at least two vinylarene-rich (AR) segments and at least two vinylarene-poor (AP) segments. Each (AR) segment independently comprises, in polymerized form, >10 mol % of the vinylarene. Each (AP) segment independently comprises, in polymerized form. ≤10 mol % of the vinylarene. Each mol % is based on the total moles of polymerized monomers in the respective segment. The multiblock interpolymer comprises, in polymerized form, ethylene, the alpha-olefin and the vinylarene, and may comprise other monomer types. The term "ethylene/alpha-olefin/vinylarene multiblock terpolymer," as used herein, refers to a multiblock terpolymer that comprises at least two vinylarene-rich (AR) segments, as discussed above, and at least two vinylarene-poor (AP) segments, as discussed above. The multiblock terpolymer comprises, in polymerized form, ethylene, the alpha-olefin, the vinylarene, as the only three monomer types.

The term "vinylarene," as used herein, refers to a chemical compound comprising a "—CR═CHR' (where R and R' are each independently H or an alkyl)" bonded to an aromatic ring structure, such as a monocyclic, bicyclic or tricyclic ring structure. The aromatic ring structure may or may not comprise one or more heteroatom groups, and may or may not be substituted with one or more heteroatom groups. Examples of vinylarenes include, but are not limited to, styrene, 2-vinyl toluene and 4-vinyltoluene, and alpha-methyl styrene.

The term "alkylsilane group," as used herein, refers to a chemical group comprising at least one —Si—R moiety, where R is an alkyl. Some examples of such groups include the following: $—CH_2—Si(CH_3)_3$, $—CH_2—Si(H)(CH_3)_2$, $—CH_2—Si(H)_2(CH_3)$, $—Si(CH_3)_3$, $—Si(H)(CH_3)_2$, $—Si(H)_2CH_3$.

The term "heteroatom." refers to an atom other than hydrogen or carbon (for example, O, N or P). The term "heteroatom group" refers to a heteroatom or to a chemical group containing one or more heteroatoms.

The terms "hydrocarbon." "hydrocarbyl group," and similar terms, as used herein, refer to a respective chemical compound or chemical group, etc., containing only carbon and hydrogen atoms.

The terms "heterohydrocarbon," "heterohydrocarbyl group," and similar terms, as used herein, refer to a respective hydrocarbon," or "hydrocarbyl group, etc., in which at least one carbon atom is substituted with a heteroatom group (for example, O, N or P). The monovalent heterohydrocarbyl group may be bonded to the remaining compound of interest via a carbon atom or via a heteroatom.

The terms "substituted hydrocarbon." "substituted hydrocarbyl group," and similar terms, as used herein, refer to a respective hydrocarbon or hydrocarbyl group, etc., in which one or more hydrogen atoms is/are independently substituted with a heteroatom group.

The terms "substituted heterohydrocarbon," "substituted heterohydrocarbyl group," and similar terms, as used herein, refer to a respective heterohydrocarbon or heterohydrocarbyl group, etc., in which one or more hydrogen atoms is/are independently substituted with a heteroatom group.

The term "aryl," "aryl group," and similar terms used herein, refer to a monovalent aromatic hydrocarbyl or aromatic hydrocarbyl group, etc., comprising one or more ring structures; for example, a monocyclic, a bicyclic or a tricyclic ring structure.

The term "heteroaryl," "heteroaryl group," and similar terms used herein, refer to a monovalent aryl or aryl group, etc., in which at least one carbon atom of the backbone ring structure is substituted with a heteroatom group.

The terms "substituted aryl," "substituted aryl group." and similar terms, as used herein, refer to an aryl or aryl group, etc., in which one or more hydrogen atoms is/are independently substituted with a heteroatom group.

The terms "substituted heteroaryl." "substituted heteroaryl group." and similar terms, as used herein, refer to a heteroaryl or heteroaryl group, etc., in which one or more hydrogen atoms is/are independently substituted with a heteroatom group.

The term "arylene," "arylene group," and similar terms used herein, refer to a divalent aromatic hydrocarbylene or aromatic hydrocarbylene group, etc., comprising one or more ring structures; for example, a monocyclic, a bicyclic or a tricyclic ring structure.

The terms "substituted arylene," "substituted arylene group," and similar terms, as used herein, refer to an arylene or arylene group, etc., in which one or more hydrogen atoms is/are independently substituted with a heteroatom group.

The term "substituted or unsubstituted ($C_1$-$C_{30}$)hydrocarbyl," and other like terms, as used herein, denote the range of total carbon atoms (for example, from 1 to 30) that a substituted or unsubstituted hydrocarbyl radical may contain. Note, other monovalent chemical groups (for example, a substituted or unsubstituted ($C_6$-$C_{20}$) aryl group) with a noted carbon range are defined in like manner.

The term "substituted or unsubstituted ($C_1$-$C_{30}$)heterohydrocarbyl," and other like terms, as used herein, denote the range of total carbon atoms (for example, from 1 to 30) that a "substituted or unsubstituted heterohydrocarbyl radical may contain. Note, other monovalent chemical groups with a noted carbon range are defined in like manner.

The term "substituted or unsubstituted ($C_6$-$C_{20}$) arylene group." and other like terms, as used herein, denote the range of total carbon atoms (for example 2 to 6) that a substituted or unsubstituted arylene group may contain. Note, other divalent chemical groups with a noted carbon range are defined in like manner.

The term "Lewis base," as used herein, in reference to a metal complex, refers to a chemical compound or chemical group that can donate a pair of electrons to form a bond with a metal or another chemical group. Examples of Lewis bases include, but are not limited to, tetrahydrofuran (THF), diethylether, dimethylaniline, or trimethylphosphine.

The terms "syndiotacticity," "syndiotactic." and similar terms, as used herein, in reference to polymerized vinylarene units, refer to an alternating stereochemical configuration of two or more pendant aryl (for example, phenyl) groups. See for example, subsegment sbb.

The term "polymer structure," in reference to an ethylene/vinylarene multiblock interpolymer of Structures 1 and 2, refers to either a portion of a polymer chain as shown in Structure 1 or to the entire polymer chain as shown in Structure 2.

The notation "AR," in reference to a multiblock interpolymer, refer to a polymer segment of the interpolymer that comprises, in polymerize form, >10 mol % of a vinylarene. This notation refers to a "vinylarene-rich" segment.

The notation "AP," in reference to multiblock interpolymer, refer to a polymer segment of the interpolymer that comprises, in polymerize form, ≤10 mol % of a vinylarene. This notation refers to a "vinylarene-poor" segment.

The phrase "each segment." in reference to an (AR) segment (or block) or an (AP) segment (or block), refers to an (AR) segment or an (AP) segment located at the end of the polymer molecule or within the polymer molecule.

The term "solution polymerization," as used herein, refers to a polymerization process in which the monomer(s), catalyst(s) and formed polymer are all soluble in the polymerization solvent or solvent blend of two or more solvents.

The term "continuous solution polymerization," as used herein, refers to a solution polymerization in which monomer(s) are continually fed to a reactor, and polymer is continually removed from the reactor.

The term "metal complex." as used herein, refers to a chemical structure comprising a metal or metal ion that is bonded and/or coordinated to one or more ligands (ions or molecules that contain one or more pairs of electrons that can be shared with the metal). See for example, the metal complexes of Formulas A and B. The metal complex is typically rendered catalytically active by the use of one or more cocatalysts.

The term "scavenger," as used herein, refers to a chemical compound added to a polymerization reaction to remove or deactivate impurities or unwanted reaction products (for example, oxygen). Examples of some scavenger include aluminum alkyl compounds, such as MMAO and MMAO-3A.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

Listing of Some Processes and Compositions

A] A process to form a composition comprising an ethylene/vinylarene multiblock interpolymer, said process comprising polymerizing, in a single reactor, a mixture comprising ethylene, a vinylarene, and optionally an alpha-olefin, in the presence of at least the following components a)-c):

a) a first metal complex selected from the following Formula A:

(Formula A)

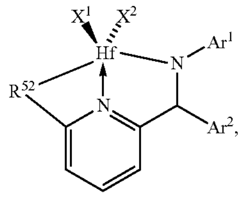

wherein $X^1$ and $X^2$ are each independently selected from a substituted or unsubstituted ($C_1$-$C_{30}$) hydrocarbyl, a substituted or unsubstituted ($C_1$-$C_{30}$) heterohydrocarbyl, and further a substituted or unsubstituted ($C_1$-$C_{30}$) hydrocarbyl, and further an alkyl; and wherein $X^1$ and $X^2$ may optionally be linked;

$Ar^1$ and $Ar^2$ are each, independently, a substituted or unsubstituted aryl or a substituted or unsubstituted heteroaryl group, $R^{52}$ is a substituted or unsubstituted arylene group;

b) a second metal complex selected from the following Formula B:

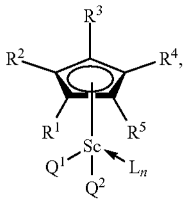

wherein $R^1$, $R^2$, $R^3$, $R^4$, and $R^5$ are each independently H, a substituted or unsubstituted hydrocarbyl group or a substituted or unsubstituted heterohydro-carbyl group; and further H, an alkyl group or an alkylsilyl group; and further an alkyl group or an alkylsilyl group;

$Q^1$ and $Q^2$ are each independently a substituted or unsubstituted hydrocarbyl group, a substituted or unsubstituted heterohydrocarbyl group, or a halogen; and further an aryl group, an alkylsilyl group, an alkoxy group, a halogen, or —NRR', wherein R and R' are each independently a hydrocarbyl or an SiR", where R" is an hydrocarbyl; and further an aryl group, an alkylsilyl group, or an alkoxy group; and L is a Lewis base; each n is independently 0 or 1; and wherein optionally at least one L group and at least one Q group are connected, and optionally at least one R group and at least one Q group are connected;

c) a chain shuttling agent selected from the following: a dialkyl zinc, a trialkyl aluminum, or a combination thereof.

B]. The process of A] above, wherein, for Formula A, $X^1$ and $X^2$ are each independently a substituted or unsubstituted ($C_1$-$C_{30}$)hydrocarbyl, and further an alkyl, and further $X^1$=$X^2$.

C] The process of A] or B] above, wherein Formula A is selected from the following structures (a11) or (a12):

(a11)

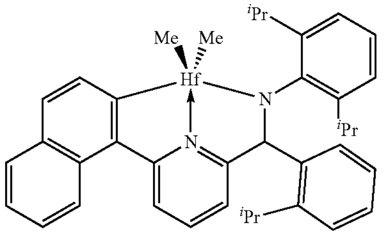

or (a12)

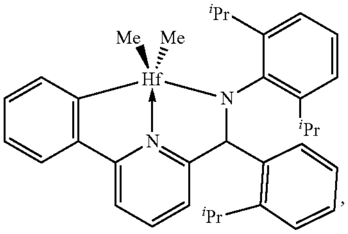

, and further from structure (a11).

D] The process of any one of A]-C] above, wherein, for Formula B, $R^1$-$R^5$ are each, independently, H, an alkyl, and further a $C_1$-$C_5$ alkyl, further a $C_1$-$C_4$ alkyl, further a $C_1$-$C_3$ alkyl, further a $C_1$-$C_2$ alkyl, further methyl.

E] The process of any one of A]-D] above, wherein, for Formula B, $R^1$=$R^2$=$R^3$=$R^4$=$R^5$.

F] The process of any one of A]-E] above, wherein Formula B is selected from the following structures (b11) or (b12):

(b11)

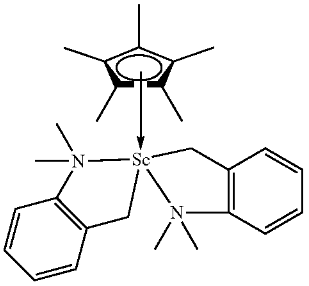

or

-continued (b12)

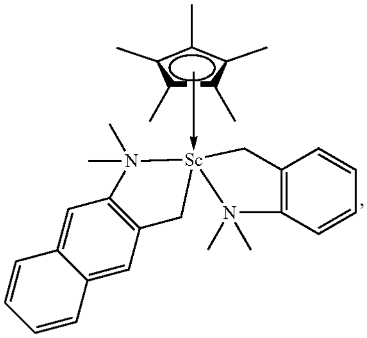

, and further from structure (b11).

G] The process of any one of A]-F] above, wherein for Formula B, L is selected from tetrahydrofuran (THF), diethylether, dimethylaniline, or trimethylphosphine, and further THF.

H] The process of any one of A]-F] above, wherein for Formula B, n=0.

I] The process of any one of A]-H] above, wherein, the chain shuttling agent (component c) is selected from the following: $Zn(CH_2CH_3)_2$, $Al(CH_2CH_3)_3$, or a combination thereof.

J] The process of any one of A]-I] above, wherein, the polymerization is a solution polymerization, and further a continuous solution polymerization.

K] The process of J] above, wherein, the solution is an aromatic solution, and further toluene.

L] The process of any one of A]-K] above, wherein, the polymerization takes place a temperature ≥80° C., or ≥85° C., or ≥90° C., or ≥95° C., or ≥100° C., or ≥105° C., or ≥110° C.

M] The process of any one of A]-L] above, wherein the polymerization takes place at a temperature ≤160° C., or ≤155° C., or ≤150° C., or ≤145° C., or ≤140° C., or ≤135° C., or ≤130° C., or ≤125° C., or ≤120° C.

N] The process of any one of A]-M] above, wherein the polymerization takes place at a pressure ≥50 psig, or ≥60 psig, or ≥70 psig, or ≥75 psig, or ≥80 psig.

O] The process of any one of A]-N] above, wherein the polymerization takes place at a pressure ≤120 psig, or ≤110 psig, or ≤100 psig, or ≤95 psig, or ≤90 psig.

P] The process of any one of A]-O] above, wherein the mixture comprises the alpha-olefin.

Q] The process of P] above, wherein the alpha-olefin is a $C_3$-$C_{20}$ alpha-olefin, further a $C_3$-$C_{10}$ alpha-olefin, further a $C_3$-$C_8$ alpha-olefin, further propylene, 1-butene, 1-hexene or 1-octene, further propylene, 1-butene or 1-octene, further 1-butene or 1-octene, further 1-octene.

R] The process of any one of A]-Q] above, wherein the molar ratio of "the metal of the first metal complex" to "the metal of the second metal complex" is ≥0.03, or ≥0.1, or ≥0.5.

S] The process of any one of A]-R] above, wherein the molar ratio of "the metal of the first metal complex" to "the metal of the second metal complex" is ≤1000, or ≤500, or ≤100.

T] The process of any one of A]-S] above, wherein the molar ratio of "the metal of the chain shuttling agent" to "the sum of the metal of the first metal complex and the metal of the second metal complex" is ≥2.0, or ≥5.0, or ≥10, or ≥20, or ≥40, or ≥100.

U] The process of any one of A]-T] above, wherein the molar ratio of "the metal of the chain shuttling agent" to "the sum of the metal of the first metal complex and the metal of the second metal complex" is ≤1000, or ≤800, or ≤500.

V] The process of any one of A]-U] above, wherein the first metal complex has a reactivity ratio, $r_{(ethylene)(vinylarene)}=k_{(ethylene)(ethylene)}/k_{(ethylene)(vinylarene)}$, from 50 to 1000, further from 100 to 500.

W] The process of any one of A]-V] above, wherein the second metal complex has a reactivity ratio, $r_{(ethylene)(vinylarene)}=k_{(ethylene)(ethylene)}/k_{(ethylene)(vinylarene)}$, from 1 to 10.

X] The process of any one of A]-W] above, wherein composition further comprises a polyethylene homopolymer, an ethylene/vinylarene copolymer, an ethylene/alpha-olefin copolymer, or a combination thereof.

Y] A composition formed from the process of any one of A]-X].

A2] A composition comprising an ethylene/vinylarene multiblock interpolymer, said interpolymer comprising at least one polymer structure selected from Structure 1 or Structure 2, each as shown below, and where (AR) refers to a vinylarene rich segment and (AP) refers to a vinylarene poor segment:

-(AR)-(AP)-(AR)-(AP)- (Structure 1), (AR)-(AP)-(AR)-(AP) (Structure 2), wherein each (AR) segment independently comprises, in polymerized form, ethylene, the vinylarene and optionally an alpha-olefin; and wherein each (AP) segment independently comprises, in polymerized form, ethylene, optionally the vinylarene and optionally the alpha-olefin; and wherein each (AR) segment independently comprises, in polymerized form, >10 mol % of the vinylarene, based on the total moles of polymerized monomers in the (AR) segment; and wherein each (AP) segment independently comprises, in polymerized form, ≤10 mol % of the vinylarene, based on the total moles of polymerized monomers in the (AP) segment.

B2] The composition of A2] above, wherein, for the ethylene/vinylarene multiblock interpolymer, each (AR) segment independently comprises, in polymerized form, ≥15 mol %, or ≥20 mol %, or ≥25 mol %, or ≥30 mol %, or ≥35 mol %, or ≥40 mol %, or ≥45 mol %, or ≥50 mol %, or ≥55 mol %, or ≥60 mol %, of the vinylarene, based on the total moles of polymerized monomers in the (AR) segment.

C2] The composition of A2] or B2] above, wherein, for the ethylene/vinylarene multiblock interpolymers, each (AR) segment independently comprises, in polymerized form, ≤100 mol %, or ≤98 mol %, or ≤96 mol %, or ≤94 mol %, or ≤92 mol %, or ≤91 mol % of the vinylarene, based on the total moles of polymerized monomers in the (AR) segment.

D2] The composition of any one of A2]-C2] above, wherein, for the ethylene/vinylarene multiblock interpolymer, each (AP) segment independently comprises, in polymerized form, ≥0 mol %, or ≥0.2 mol %, or ≥0.4 mol %, or ≥0.6 mol %, or ≥0.8 mol %, or ≥1.0 mol % of the vinylarene, based on the total moles of polymerized monomers in the (AP) segment.

E2] The composition of any one of A2]-D2] above, for the ethylene/vinylarene multiblock interpolymer, each (AP) segment independently comprises, in polymerized form, ≤10 mol %, or ≤9.0 mol %, or ≤8.0 mol %, or ≤7.0 mol %, or ≤6.0 mol %, or ≤5.0 mol % of the vinylarene, based on the total moles of polymerized monomers in the (AP) segment.

F2] The composition of any one of A2]-E2] above, wherein, for the ethylene/vinylarene multiblock interpolymer, each (AR) segment independently comprises, in polymerized form, ≥2.0 mol %, or ≥4.0 mol %, or ≥6.0 mol %, or ≥8.0 mol %, or ≥9.0 mol %, or ≥10 mol %, or ≥11 mol %, or ≥12 mol %, or ≥13 mol %, or ≥14 mol % of ethylene, based on the total moles of polymerized monomers in the (AR) segment.

G2] The composition of any one of A2]-F2] above, wherein, for the ethylene/vinylarene multiblock interpolymer, each (AR) segment independently comprises, in polymerized form, ≤80 mol %, or ≤77 mol %, or ≤75 mol %, or ≤73 mol %, or ≤70 mol %, or ≤65 mol %, or ≤60 mol %, or ≤55 mol %, or ≤50 mol %, or ≤45 mol %, or ≤40 mol % of ethylene, based on the total moles of polymerized monomers in the (AR) segment.

H2υ The composition of any one of A2]-G2] above, wherein, for the ethylene/vinylarene multiblock interpolymer, each (AP) segment independently comprises, in polymerized form, ≥50 mol %, ≥52 mol %, or ≥54 mol %, or ≥56 mol %, or ≥58 mol %, or ≥60 mol %, or ≥62 mol %, or ≥64 mol %, or ≥66 mol %, or ≥68 mol %, or ≥70 mol % of ethylene, based on the total moles of polymerized monomers in the (AP) segment.

I2] The composition of any one of A2]-H2] above, wherein, for the ethylene/vinylarene multiblock interpolymer, each (AP) segment independently comprises, in polymerized form, ≤100 mol %, or ≤98 mol %, or ≤96 mol %, or ≤94 mol %, or ≤92 mol %, or ≤90 mol % of ethylene, based on the total moles of polymerized monomers in the (AP) segment.

J2] The composition of any one of A2]-I2] above, wherein, for the ethylene/vinylarene multiblock interpolymer, each (AR) segment independently comprises, in polymerized form. ≥0 mol %, ≥1.0 mol %, or ≥2.0 mol %, or ≥3.0 mol %, or ≥4.0 mol %, of the alpha-olefin, based on the total moles of polymerized monomers in the (AR) segment.

K2] The composition of any one of A2]-J2] above, wherein, for the ethylene/vinylarene multiblock interpolymer, each (AR) segment independently comprises, in polymerized form, ≤10 mol %, ≤9.0 mol %, or ≤8.0 mol %, or ≤7.0 mol %, or ≤6.0 mol %, of the alpha-olefin, based on the total moles of polymerized monomers in the (AR) segment.

L2] The composition of J2] or K2] above, wherein, the alpha-olefin is a $C_3$-$C_{20}$ alpha-olefin, further a $C_3$-$C_{10}$ alpha-olefin, further a $C_3$-$C_8$ alpha-olefin, further propylene, 1-butene, 1-hexene or 1-octene, further propylene, I-butene or 1-octene, further 1-butene or 1-octene, further 1-octene.

M2] The composition of any one of A2]-L2] above, wherein, for the ethylene/vinylarene multiblock interpolymer, each (AR) segment does not comprises, in polymerized form, the alpha-olefin.

N2] The composition of any one of A2]-M2] above, wherein, for the ethylene/vinylarene multiblock interpolymer, each (AP) segment independently comprises, in polymerized form, ≥0 mol %. ≥1.0 mol %, or ≥2.0 mol %, or ≥3.0 mol %, or ≥4.0 mol %, or ≥6.0 mol %, or ≥8.0 mol %, or ≥10 mol % of the alpha-olefin, based on the total moles of polymerized monomers in the (AP) segment.

O2] The composition of any one of A2]-N2] above, wherein, for the ethylene/vinylarene multiblock interpolymer, each (AP) segment independently comprises, in polymerized form, ≤40 mol %, or ≤35 mol %, or ≤30 mol %, or ≤28 mol %, or ≤26 mol %, or ≤24 mol %, or ≤22 mol %, or ≤20 mol % of the alpha-olefin, based on the total moles of polymerized monomers in the (AP) segment.

P2] The composition of N2] or O2] above, wherein, the alpha-olefin is a $C_3$-$C_{20}$ alpha-olefin, further a $C_3$-$C_{10}$ alpha-olefin, further a $C_3$-$C_8$ alpha-olefin, further propylene, 1-butene, 1-hexene or 1-octene, further propylene, 1-butene or 1-octene, further 1-butene or 1-octene, further 1-octene.

Q2] The process of any one of A]-X] above or the composition of any one of A2]-P2] above, wherein, for the ethylene/vinylarene multiblock interpolymer, each (AR) segment independently comprises ≥20 mol % or ≥30 mol %, or ≥40 mol %, or ≥50 mol % or ≥60 mol %, or ≥70 mol %, or ≥80 mol %, or ≥85 mol %, or ≥90 mol %, or ≥92 mol %, or ≥94 mol %, or ≥96 mol %, or ≥98 mol %, or ≥99 mol % of the polymerized vinylarene in a "back to back" configuration, as shown below in subsegment bb:

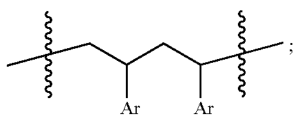;

(subsegment bb)

and wherein the mol % is based on the total moles of polymerized vinylarene in the (AR) segment.

R2] The process of any one of A]-X] or Q2] above or the composition of any one of A2]-Q2] above, wherein, for the ethylene/vinylarene multiblock interpolymer, each (AR) segment independently comprises ≤100 mol % of the polymerized vinylarene in a "back to back" configuration, as shown in subsegment bb above.

S2] The process of any one of A]-X] or Q2] or R2] above or the composition of any one of A2]-R2] above, wherein, for the ethylene/vinylarene multiblock interpolymer, each (AR) segment independently comprises ≥20 mol % or ≥30 mol %, or ≥40 mol %, or ≥50 mol % or ≥60 mol %, or ≥70 mol %, or ≥80 mol %, or >85 mol %, or >90 mol %, or >92 mol %, or >94 mol %, or >96 mol %, or ≥98 mol %, or ≥99 mol % of the polymerized vinylarene in a syndiotactic "back to back" configuration, as shown below in subsegment sbb:

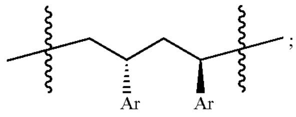;

(subsegment sbb)

and wherein the mol % is based on the total moles of polymerized vinylarene in the (AR) segment.

T2] The process of any one of A]-X] or Q2]-S2] above or the composition of any one of A2]-S2] above, wherein, for the ethylene/vinylarene multiblock interpolymer, each (AR) segment independently comprises ≤100 mol % of the polymerized vinylarene in a syndiotactic "back to back" configuration, as shown in subsegment sbb above.

U2] The process of any one of A]-X] or Q2]-T2] above or the composition of any one of A2]-T2] above, wherein, for the ethylene/vinylarene multiblock interpolymer, each (AP) segment independently comprises ≥0 and ≤5.0 mol %, or ≤2.0 mol %, or ≤1.0 mol %, or ≤0.5 mol %, or ≤0.2 mol %, or ≤0.1 mol % of the polymerized vinylarene present in a "back to back" configuration, as shown below in subsegment bb:

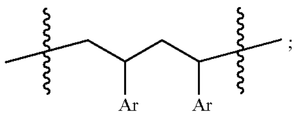

(subsegment bb)

and wherein the mol % is based on the total moles of polymerized vinylarene in the (AP) segment.

V2] The process of any one of A]-X] or Q2]-U2] above or the composition of any one of A2]-U2] above, wherein, for the ethylene/vinylarene multiblock interpolymer, none of the polymerized vinylarene in each (AP) segment is present in a "back to back" configuration as shown in subsegment bb above.

W2] The process of any one of A]-X] or Q2]-V2] above or the composition of any one of A2]-V2] above, wherein, for the ethylene/vinylarene multiblock interpolymer, the vinylarene is styrene.

X2] The process of any one of A]-X] or Q2]-W2] above or the composition of any one of A2]-W2] above, wherein the ethylene/vinylarene multiblock interpolymer is an ethylene/alpha-olefin/vinylarene multiblock interpolymer and further an ethylene/alpha-olefin/vinylarene multiblock terpolymer.

Y2] The process of any one of A]-X] or Q2-X2] above or the composition of any one of A2]-X2] above, wherein the composition has a molecular weight distribution ($MWD=M_w/M_n$) ≥2.5, or ≥2.6, or ≥2.7, or ≥2.8, or 2.9, or ≥3.0, or ≥3.1.

Z2] The process of any one of A]-X] or Q2]-Y2] above or the composition of any one of A2]-Y2] above, wherein the composition has a molecular weight distribution MWD ≤20, or ≤10, or ≤8.0, or ≤6.0, or ≤≤5 or ≤5.0 or ≤4.5 or ≤4.0.

A3] The process of any one of A]-X] or Q2]-Z2] above or the composition of any one of A2]-Z2] above, wherein the composition has a number average molecular weight ($M_n$) ≥10,000 g/mol, or ≥12,000 g/mol, or ≥14,000 g/mol, or ≥16,000 g/mol, or ≥18,000 g/mol.

B3] The process of any one of A]-X] or Q2]-A3] above or the composition of any one of A2]-A3] above, wherein the composition has a Mn≤100,000 g/mol or ≤90.000 g/mol, or ≤80,000 g/mol, or ≤70,000 g/mol, or 65,000 g/mol or ≤60,000 g/mol, or ≤55,000 g/mol.

C3] The process of any one of A]-X] or Q2]-B3] above or the composition of any one of A2]-B3] above, wherein the composition has a weight average molecular weight ($M_w$) ≥30,000 g/mol, ≥35,000 g/mol, ≥40,000 g/mol, ≥45,000 g/mol.

D3] The process of any one of A]-X] or Q2]-C3] above or the composition of any one of A2]-C3] above, wherein the composition has a $M_w$≤400,000 g/mol, or ≤350,000 g/mol, or ≤300,000 g/mol, or ≤250,000 g/mol, or ≤200,000 g/mol.

E3] The process of any one of A]-X] or Q2]-D3] above or the composition of any one of A2]-D3] above, wherein the composition has a melt index ($I_2$) ≥0.5 dg/min, or ≥1.0 dg/min. or ≥2.0 dg/min, or ≥5.0 dg/min, or ≥10 dg/min.

F3] The process of any one of A]-X] or Q2]-E3] above or the composition of any one of A2]-E3] above, wherein the composition has a melt index (I2) ≤1,000 dg/min, or ≤500 dg/min, or ≤250 dg/min, or ≤100 dg/min, or ≤50 dg/min, or ≤20 dg/min.

G3] The process of any one of A]-X] or Q2]-F3] above or the composition of any one of A2]-F3] above, wherein the composition has a $T_m$≥100° C., or ≥120° C., or 150° C., or ≥200° C., or ≥220° C., or ≥230° C., or ≥240° C., or ≥250° C.

H3] The process of any one of A]-X] or Q2]-G3] above or the composition of any one of A2]-G3] above, wherein the composition has a $T_m$≤300° C., or, ≤290° C., or ≤285° C., or ≤280° C., or ≤275° C., or ≤270° C., or ≤265° C.

I3] The process of any one of A]-X] or Q2]-H3] above or the composition of any one of A2]-H3] above, wherein the composition has a $T_g$≥−75° C., or ≥−70° C., or ≥−65° C.

J3] The process of any one of A]-X] or Q2]-I3] above or the composition of any one of A2]-I3] above, wherein the composition has a $T_g$≤10° C., or ≤0° C., or ≤−20° C., or ≤−30° C. or ≤−40° C., or −50° C., or ≤−55° C.

K3] The process of any one of A]-X] or Q2]-J3] above or the composition of any one of A2]-J3] above, wherein the composition comprises, in polymerized form, ≥5.0 mol %, or ≤10 mol %, or ≥12 mol %, or ≥14 mol % of the vinylarene, based on the total moles of polymerized monomers in the composition.

L3] The process of any one of A]-X] or Q2]-K3] above or the composition of any one of A2]-K3] above, wherein the composition comprises, in polymerized form, ≤60 mol %, or ≤55 mol %, or ≤50 mol %, or ≤45 mol % of the vinylarene, based on the total moles of polymerized monomers in the composition.

M3] The process of any one of A]-X] or Q2]-L3] above or the composition of any one of A2]-L3] above, wherein the composition comprises, in polymerized form, ≥10 mol %, or ≥15 mol %, or ≥20 mol %, or ≥25 mol % of ethylene, based on the total moles of polymerized monomers in the composition.

N3] The process of any one of A]-X] or Q2]-M3] above or the composition of any one of A2]-M3] above, wherein the composition comprises, in polymerized form, ≤90 mol %, or ≤85 mol %, or ≤80 mol %, or ≤78 mol %, or ≤76 mol %, or ≤74 mol %, or ≤72 mol %, or ≤70 mol % of ethylene, based on the total moles of polymerized monomers in the composition.

O3] The process of any one of A]-X] or Q2]-N3] above or the composition of any one of A2]-N3] above, wherein the composition comprises, in polymerized form, ≥2.0 mol %. ≥5.0 mol %, or ≥10 mol %, or ≥12 mol %, or ≥14 mol %, or ≥16 mol % of the alpha-olefin, based on the total moles of polymerized monomers in the composition.

P3] The process of any one of A]-X] or Q2]-O3] above or the composition of any one of A2]-O3] above, wherein the composition comprises, in polymerized form, ≤50 mol %, or ≤45 mol %, or ≤40 mol %, or ≥35 mol % of the alpha-olefin, based on the total moles of polymerized monomers in the composition.

Q3] The process of any one of A]-X] or Q2]-P3] above or the composition of O3] or P3] above, wherein, the alpha-olefin is a $C_3$-$C_{20}$ alpha-olefin, further a $C_3$-$C_{10}$ alpha-olefin, further a $C_3$-$C_8$ alpha-olefin, further propylene, 1-butene, 1-hexene or 1-octene, further propylene, 1-butene or 1-octene, further 1-butene or 1-octene, further 1-octene.

R3] The process of any one of A]-X] or Q2]-Q3] above or the composition of any one of A2]-Q3] above, wherein for the composition, the molar ratio of block styrene (b-b in AR) to isolated styrene is ≥2.0, ≥4.0, or ≥6.0, or ≥8, or ≥10.

S3] The process of any one of A]-X] or Q2]-R3] above or the composition of any one of A2]-R3] above, wherein, for the composition, the molar ratio of block styrene (b-b in AR) to isolated styrene is ≤30, or ≤25.

T3] The process of any one of A]-X] or Q2]-S3] above or the composition of any one of A2]-S3] above, wherein the vinylarene is styrene.

U3] The process of any one of A]-X] or Q2]-T3] above or the composition of any one of A2]-T3] above, wherein the ethylene/vinylarene multiblock interpolymer is an ethylene/vinyl-arene/alpha-olefin multiblock interpolymer, and further an ethylene/vinylarene/alpha-olefin multiblock terpolymer.

V3] The process of any one of A]-X] or Q2]-U3] above or the composition of any one of A2]-U3] above, wherein composition further comprises a polyethylene homopolymer, an ethylene/vinylarene copolymer, an ethylene/alpha-olefin copolymer, or a combination thereof.

W3] The composition of any one of A2]-V3] above, wherein the composition further comprises a thermoplastic polymer, different from the ethylene/vinylarene multiblock interpolymer in one or more features, such as monomer(s) types and/or amounts, $T_m$, $T_g$, $M_n$, $M_w$, MWD, or any combination thereof, and further, in one or more features, such as monomer(s) types and/or amounts, $T_m$, $T_g$, or any combination thereof.

X3] An article comprising at least one component formed from the composition of any one of Y] or A2]-W3] above.

Y3] A process to form the composition of any one of A2]-V3] above, said process comprising polymerizing, in a single reactor, a mixture comprising ethylene, a vinylarene, and optionally an alpha-olefin, in the presence of at least the following a)-c):

a) a first metal complex selected from the following Formula A, as described above;

b) a second metal complex selected from the following Formula B, as described above;

c) a chain shuttling agent selected from the following: a dialkyl zinc, a trialkyl aluminum, or a combination thereof.

Test Methods

Gel Permeation Chromatography (Conventional)

The chromatographic system consisted of a PolymerChar GPC-IR (Valencia, Spain) high temperature GPC chromatograph, equipped with an internal IR5 infra-red detector (IR5). The autosampler oven compartment was set at 160° C., and the column compartment was set at 150° C. The columns were four AGILENT “Mixed A” 30 cm, 20-micron linear mixed-bed columns. The chromatographic solvent was 1,2,4-trichlorobenzene, which contained “200 ppm” of butylated hydroxytoluene (BHT). The solvent source was nitrogen sparged. The injection volume used was 200 microliters, and the flow rate was 1.0 milliliters/minute.

Calibration of the GPC column set was performed with 21 narrow molecular weight distribution polystyrene standards, with molecular weights ranging from 580 to 8,400,000, and which were arranged in six “cocktail” mixtures, with at least a decade of separation between individual molecular weights. The standards were purchased from Agilent Technologies. The polystyrene standards were prepared at “0.025 grams in 50 milliliters” of solvent, for molecular weights equal to, or greater than, 1,000,000, and at “0.05 grams in 50 milliliters” of solvent, for molecular weights less than 1,000,000. The polystyrene standards were dissolved at 80° C., with gentle agitation, for 30 minutes. The polystyrene standard peak molecular weights were converted to polyethylene molecular weights using Equation 1 (as described in Williams and Ward, J. Polym. Sci., Polym. Let., 6, 621 (1968)):

$M_{polyethylene}=A\times(M_{polystyrene})^B$ (EQ 1), where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects, such that linear homopolymer polyethylene standard is obtained at 120,000 $M_w$. The total plate count of the GPC column set was performed with decane (prepared at “0.04 g in 50 milliliters” of TCB, and dissolved for 20 minutes with gentle agitation). The plate count (Equation 2) and symmetry (Equation 3) were measured on a “200 microliter injection,” according to the following equations:

$$\text{Plate Count} = 5.54 * \left(\frac{(RV_{Peak\ Max}}{\text{Peak Width at } \frac{1}{2}\text{height}}\right)^2, \quad \text{(EQ 2)}$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\ tenth\ height} - RV_{Peak\ max})}{(RV_{Peak\ max} - Front\ Peak\ RV_{one\ tenth\ height})}, \quad \text{(EQ 3)}$$

where RV is the retention volume in milliliters, and the peak width is in milliliters, Peak max is the maximum position of the peak, one tenth height is 1/10 height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22.

Samples were prepared in a semi-automatic manner with the PolymerChar “Instrument Control” Software, wherein the samples (weight-targeted at “2 mg/ml”) and the solvent (contained 200 ppm BHT) were added to a pre nitrogen-sparged, septa-capped vial, via the PolymerChar high temperature autosampler. The samples were dissolved for two hours at 160° C. under “low speed” shaking.

The calculations of $M_{n(GPC)}$, $M_{w(GPC)}$, and $M_{z(GPC)}$ were based on GPC results using the internal IR5 detector (measurement channel) of the PolymerChar GPC-IR chromatograph according to Equations 4-6, using the PolymerChar GPCOne™ Software, the baseline-subtracted IR chromatogram at each equally-spaced data collection point (i), and the polyethylene equivalent molecular weight obtained from the narrow standard calibration curve for the point (i) from Equation 1. Equations 4-6 are as follows:

$$Mn_{(GPC)} = \frac{\sum^{i}(IR_i}{\sum^{i}(IR_i/M_{polyethylene_i})}, \quad \text{(EQ 4)}$$

-continued $$Mw_{(GPC)} = \frac{\sum^{i}\left(IR_i * M_{polyethylene_i}\right)}{\sum^{i} IR_i}, \text{ and} \quad \text{(EQ 5)}$$

$$Mz_{(GPC)} = \frac{\sum^{i}\left(IR_i * M^2_{polyethylene_i}\right)}{\sum^{i}\left(IR_i * M_{polyethylene_i}\right)}. \quad \text{(EQ 6)}$$

In order to monitor the deviations over time, a flowrate marker (decane) was introduced into each sample, via a micropump controlled with the PolymerChar GPC-IR system. This flowrate marker (FM) was used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate (effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system, based on a flow marker peak, the effective flowrate (with respect to the narrow standards calibration) was calculated as Equation 7: Flowrate(effective)=Flowrate (nominal)*(RV(FM Calibrated)/RV(FM Sample)) (EQ 7). Processing of the flow marker peak was done via the PolymerChar GPCOne™ Software. Acceptable flowrate correction is such that the effective flowrate should be within +/−0.7% of the nominal flowrate.

Melt Index

The melt index (I2) of an ethylene-based polymer is measured in accordance with ASTM D-1238, condition 190° C./2.16 kg. The melt flow rate (MFR) of a propylene-based polymer is measured in accordance with ASTM D-1238, condition 230° C./2.16 kg.

Density

ASTM D4703 is used to make a polymer plaque for density analysis. ASTM D792, Method B, is used to measure the density of the polymer.

Differential Scanning Calorimetry (DSC)

Differential Scanning Calorimetry (DSC) is used to measure $T_m$, $T_c$, $T_g$ and crystallinity in ethylene-based (PE) polymer samples and styrene-based (PS) polymer samples. About 5 to 8 mg of polymer sample was weighed and placed in a DSC pan. The lid was crimped on the pan to ensure a closed atmosphere. Unless otherwise stated, the sample pan was placed in a DSC cell, and then heated, at a rate of 10° C./min, to a temperature of 180° C. for PE (300° C. for PS). The sample was kept at this temperature for three minutes. Then the sample was cooled at a rate of 10° C./min to −90° C. for PE (−90° C. for PS), and kept isothermally at that temperature for three minutes. The sample was next heated at a rate of 10° C./min, until complete melting (second heat). Unless otherwise stated, melting point ($T_m$) and the glass transition temperature ($T_g$) of each polymer were determined from the second heat curve, and the crystallization temperature ($T_c$) was determined from the first cooling curve. The $T_m$ (peak temperature) and the $T_g$ were recorded. The percent crystallinity can be calculated by dividing the heat of fusion ($H_f$), determined from the second heat curve, by a theoretical heat of fusion of 292 J/g for PE (53 J/g for syndiotactic PS), and multiplying this quantity by 100 (for example, % cryst.=(Hf/292 J/g)×100 (for PE)).

$^{13}C$ NMR

Each sample was prepared by adding approximately 2.7 g of stock solvent to 0.2 g of sample (polymer or polymer composition or metal complex) in a 10 mm NMR tube. The stock solvent was tetrachlorethane-$d_2$ containing 0.025 M chromium acetylacetonate (relaxation agent). The sample was capped and sealed with TEFLON tape. The sample was dissolved and homogenized, by heating the tube and its contents at 130-135° C. The data were collected using a Bruker 600 MHz spectrometer equipped with a Bruker high-temperature CryoProbe. The data were acquired using a 7.3 sec pulse repetition delay (6 sec delay+1.3 sec acq. time), 90 degree flip angles, and an inverse gated decoupling, with a sample temperature of 120° C. All measurements were made on non-spinning samples in locked mode. Samples were homogenized immediately prior to insertion into a heated (125° C.) NMR sample changer, and were allowed to thermally equilibrate in the probe for seven minutes prior to data acquisition.

For each sample (polymer or polymer composition) analysis, B1 carbon (quaternary carbon on the aromatic ring) signals from 145.0 to 147.7 ppm were used as styrene contribution, and the molar amounts of polymerized monomers were calculated as follows (S=styrene, E=ethylene):

Smol=Integral (145.0-147.7 ppm)

Emol=(Integral (20.0–48.0 ppm)−2*Smol)/2

S mol %=100*Smol/(Smol+Emol)

E mol %=100−S mol %

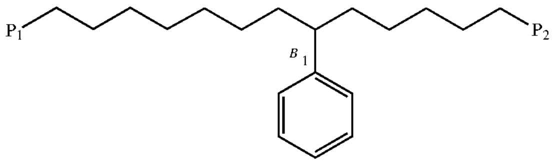

For each sample (polymer or polymer composition) analysis, B1-4 ring carbon signals from 124.0 to 148.0 ppm were used as styrene contribution, 2B6 (22.0-23.5 ppm), and 3B6 (31.5-32.7 ppm) signals were used as octene contribution, and the molar amounts of polymerized monomers were calculated as follows (S=styrene, E=ethylene, O=octene):

Smol=Integral (124.0–148.0 ppm)/6

Omol=(Integral (22.0–23.5 ppm)+Integral (31.5–32.7 ppm))/2

Emol=(Integral (11.8–48.0 ppm)−2*Smol−8*Omol)/2

Smol %=100*Smol/(Smol+Omol+Emol)

Omol %=100*Omol/(Smol+Omol+Emol)

Emol %=100−Smol %−Omol %

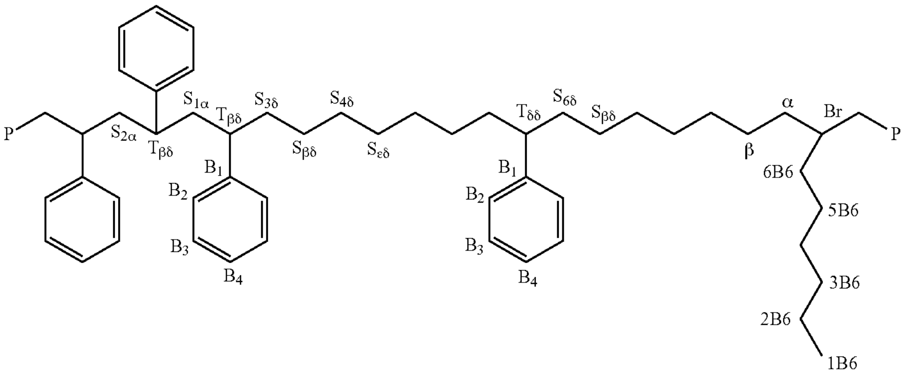

Average styrene block length=2*(Integrals $T_{\beta\beta}$+$T_{\beta\delta}$)/Integral $T_{\beta\delta}$ The ratio of block styrene to isolated styrene=(Integrals $T_{\beta\beta}$+$T_{\beta\delta}$)/Integral $T_{\delta\delta}$ $T_{\beta\beta}$ signals are methine signals centered around 41.6 ppm, $T_{\beta\delta}$ signals are methine signals centered around 43.9 ppm, and $T_{\delta\delta}$ signals are methine signals centered around 46.4 ppm.

$T_{\beta\beta}$%=100*Integral $T_{\beta\beta}$/Integral B1

$^{1}$H NMR

Each sample was prepared by adding 130 mg of sample (metal complex) to 3.25 g of tetrachlorethane-$d_2$ with 0.001 M $Cr(acac)_3$ in a 10 mm NMR tube. The sample weas purged by bubbling $N_2$ through the solvent, via a pipette inserted into the tube, for approximately five minutes, to prevent oxidation. The sample container was capped, and sealed with TEFLON tape. The sample was heated and vortexed at 115° C. to ensure homogeneity. $^{1}$H NMR was performed on a Bruker AVANCE 600 MHz spectrometer equipped with a Bruker high-temperature CryoProbe, and at a sample temperature of 120° C. $^{1}$H NMR was run with ZG pulse, 4 scans, SWH 10,000 Hz, AQ 1.64 s, $d_1$ 14 s.

Determination of Liquid Phase Monomer Concentrations by Vapor-Liquid Equilibrium (VLE) Calculations Because olefin polymerization occurs in the liquid phase within a batch reactor, it is useful to determine the reactant concentrations within the liquid phase. This can be done by experimental measurement, by sampling the liquid phase and using an online gas chromatograph, or through spectroscopic techniques, such as Fourier-Transform Near-Infrared spectroscopy or Raman spectroscopy. An alternative method is to accurately measure the amount of each reactant and solvent added to the reactor, as well as the temperature and pressure, and then use a thermodynamic "equation of state" model to calculate the amount of liquid and vapor phase present, as well as the composition of each phase. Suitable equations of state include the Redlich-Kwong-Soave [1], Peng-Robinson [2], or more recently, the Perturbed Chain Statistical associating fluid theory PC-SAFT equation of state [3]. Thermodynamic parameters can be obtained from the literature, and the equations solved in a spreadsheet or other computer calculation. Alternatively, commercial process simulation software can be used to solve the chosen equation of state model and determine conditions within the batch reactor. Examples include ASPEN PLUS [4], CHEMCAD [5], or gPROMS [6]. ASPEN PLUS in conjunction with the PC-SAFT equation of state was used in the experimental examples—see FIG. 7.

[1] Soave, Giorgio. "Equilibrium constants from a modified Redlich-Kwong equation of state". Chemical Engineering Science. 27 (6): 1197-1203.

[2] Peng, D. Y.; Robinson, D. B. "A New Two-Constant Equation of State". Industrial and Engineering Chemistry: Fundamentals. 15:59-64.

[3] Gross, Joachim; Sadowski, Gabriele. "Perturbed-Chain SAFT: An Equation of State Based on a Perturbation Theory for Chain Molecules". Industrial & Engineering Chemistry Research. 40 (4): 1244-1260.

[4] https://www.aspentech.com/products/engineering/aspen-plus

[5] https://www.chemstations.com/CHEMCAD/

[6] https://www.psenterprise.com/

EXPERIMENTAL

Study 1: Vinylarene-Rich (Hard Block) Analysis

Synthesis of $(C_5Me_5)Sc(CH_2C_6H_4NMe_2\text{-o})_2$, CAT B

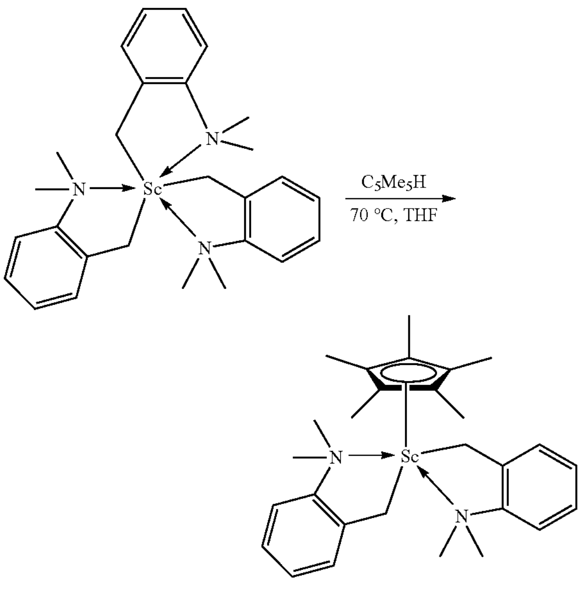

CAT B

Figure 2:
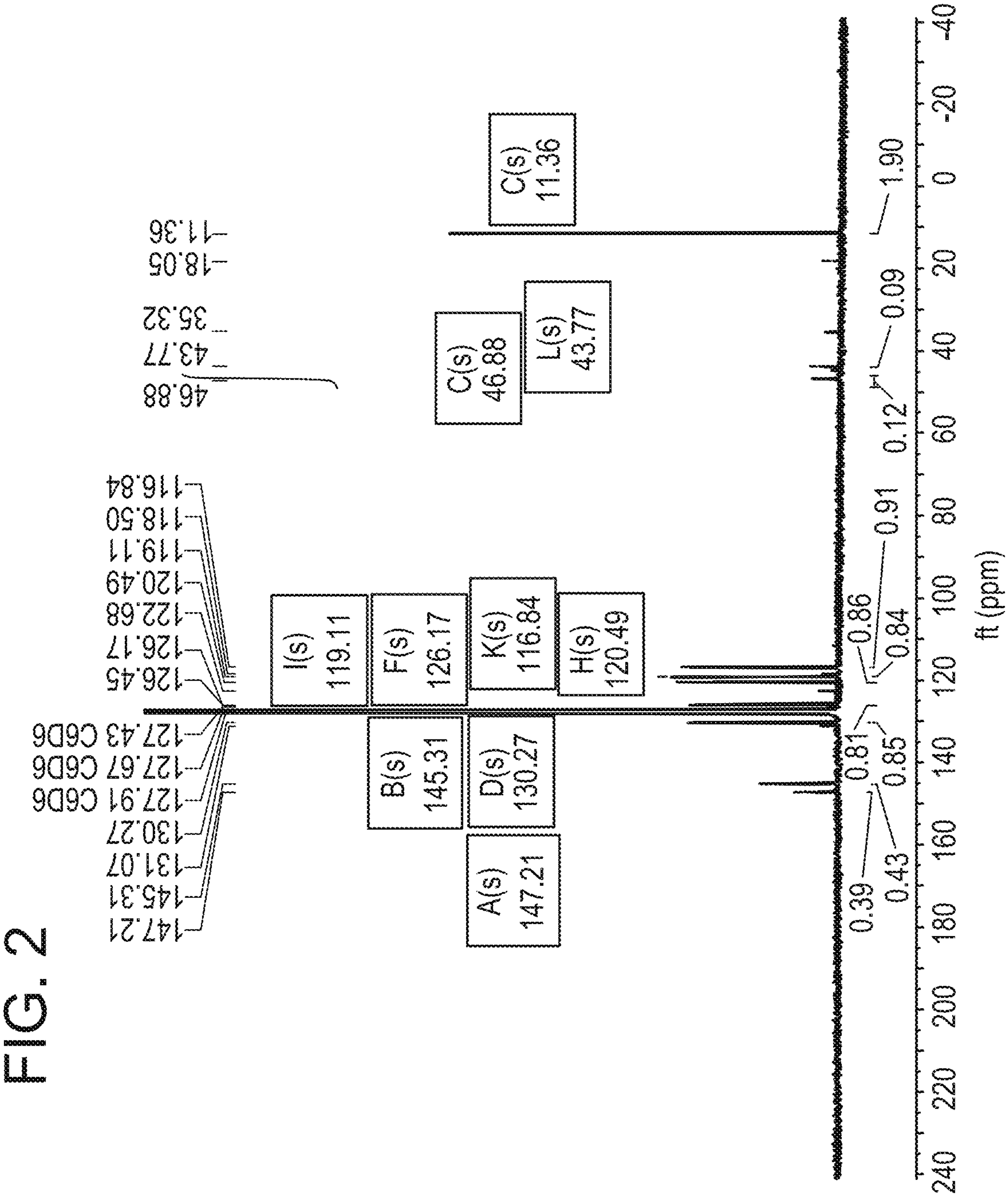
FIG. 2 depicts the $^{13}C$ NMR profile of CAT B.

In a nitrogen-filled glovebox, a THF solution (1 mL) of $Sc(CH_2CH_6H_4NMe_2\text{-o})$ 3 (0.300 g, 0.67 mmol) was added to a THE solution (1 mL) of $C_5Me_5H$ (0.105 mL, 0.67 mmol) in a 20 mL vial. The solution was heated at 70° C. for 12 hours. The solvent was removed under reduced pressure, the residue was extracted with hexane, and then filtered. A concentrated hexane solution was equilibrated at −30° C. to give yellow crystals (0.203 g, 65.5% yield). The $^{1}H$ NMR and the $^{13}C$ NMR spectra are consistent with literature reports (Chem. Commun. 2007, 40, 4137-4139). See FIG. 1 ($^{1}H$ NMR) and FIG. 2 ($^{13}C$ NMR) of the Sc complex (CAT B).

Chain Shuttling Experiments for Sc Catalyst (CAT B)

Figure 3:
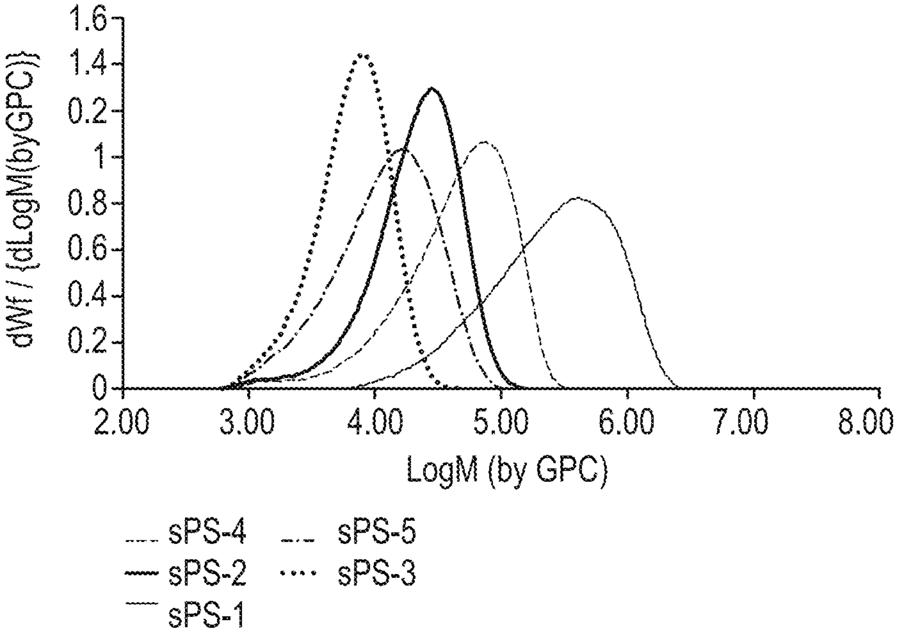
FIG. 3 depicts GPC profiles of syndiotactic polystyrene (sPS) polymers prepared from chain shuttling polymerizations. Peak maximums of the GPC profiles from left to right: starting at Log M=3.00: SP-3 (100 DEZ), "SP-5 (100 TEA), SP-2 (25 DEZ), SP-4 (25 TEA), SP-1 (no CSA).

A glass vial was charged with toluene (final volume 8 mL), styrene (1 ml), and a magnetic stir bar. CAT B (5 umol), "amines, bis(hydrogenated tallow alkyl)methyl, tetrakis(pentafluorophenyl)borate(1-) (1.2 equiv)," and either chain shuttling agent TEA or DEZ (25, or 100 umol) were sequentially added to the solution. A control solution without a chain shuttling agent was also prepared. Each mixture was heated at 100° C. for one hour, then allowed to cool, before being quenched in methanol. The polymer was collected by filtration and dried under vacuum. Polymer properties are listed in Table 1 below. GPC profiles are shown in FIG. 3. These polymerizations demonstrates chain shuttling capability of the CAT B in the presence of a chain shuttling agent. This is clearly indicated by the data in Table 1, which show the characteristic reduction in molecular weight and a narrowing in the MWD for polymerizations conducted in presence of the DEZ or the TEA.

further purification, the 1-octene and ethylene were passed through inline beds of activated alumina, 13× molecular sieves, and Q5 material. The high pressure nitrogen, for the catalyst injection and purging, was ultra-high purity grade. Styrene was degassed, and the inhibitor was removed by passing the styrene supply through a plug of neutral alumina, just prior to addition into the reactor.

Ethylene, 1-Octene, Styrene Polymerization: Reactivity of [Cp*Sc] Catalyst—CAT B Degassed, anhydrous toluene was added to the 600 mL Parr reactor from a solvent cylinder, pressurized with nitrogen, using a mass flow meter, and the reactor agitator was set to 450 rpm. Styrene was injected via a cylinder pressurized with high pressure nitrogen. When used, a preset amount of 1-octene was added to the reactor from a cylinder pressurized with nitrogen, using a flow meter. Once the reactor reached the starting temperature set point of 120° C. a preset amount of ethylene was added to the reactor, using a flow meter, followed by the addition of the active catalyst solution. The catalyst solution was prepared by adding a premade toluene solution of CAT B (typical loadings 22 μmol Sc), 0.006 M solution of "amines, bis(hydrogenated tallow alkyl)methyl, tetrakis(pentafluoro-phenyl)borate(1-)" activator in toluene (1.0-1.2 equiv), and a 0.05 M solution of MMAO-3A in toluene (10 equiv.). Each "equiv" is relative to one equiv. of CAT B.

TABLE 1

Syndiotactic Polystyrene (sPS) prepared with and without zinc or aluminum chain shuttling agents.

| CSA, umol | $M_n$ | $M_w$ | $M_w/M_n$ (MWD) | $T_g$ (° C.) | $T_m$ (° C.) | $\Delta H_m$ (° C.) | Activity ((g PS/mol Sc)/hr) | Yield PS (%) |
|---|---|---|---|---|---|---|---|---|
| None sPS-1 | 123,761 | 411,704 | 3.33 | 99 | 271 | 20.8 | 152,222 | 90 |
| DEZ, 25 sPS-2 | 13,331 | 27,143 | 2.04 | 95 | 271 | 29.8 | 191,296 | 100 |
| DEZ, 100 sPS-3 | 5,029 | 7,903 | 1.57 | 97 | 257 | 24.5 | 166,296 | 99 |
| TEA, 25 sPS-4 | 22,299 | 64,039 | 2.87 | 96 | 272 | 28.1 | 157,407 | 94 |
| TEA, 100 sPS-5 | 7,433 | 16,790 | 2.26 | 95 | 266 | 29.2 | 147,407 | 88 |

DEZ = Diethyl zinc.

TEA = Triethyl aluminum.

Batch Reactor Polymerization Set-Up (Vinylarene-Rich)

The batch reactor set-up consisted of a 600 mL Parr reactor controlled by a process control system. The reactor was equipped with an electric heating jacket, an internal cooling coil for temperature control, and electric heat traced transfer lines between the reactor and to the reactor dump pot. Three feeds were available, with the option to load solvents or monomers from a detachable one liter cylinder (50 mL). This cylinder was loaded in an inert ($N_2$) glove box, and its contents transferred to the reactor via a nitrogen injection. Catalyst components and chain shuttling agents were prepared in the inert glove box, and transferred from the 50 mL cylinder, via a nitrogen transfer, to the reactor. The 1-octene cylinders were filled from purified plant feeds. Ethylene was supplied from Airgas, as high purity grade. For The flow of ethylene, at 200 mg/min. was initiated, while the overall reactor pressure was controlled at the programmed set point, throughout the desired run time of ten minutes. Following the mixing time, the agitator was stopped, and the contents of reactor were emptied into the dump pot. The pot contents were poured into methanol, and the mixture stirred. The polymer precipitate was filtered and dried at 130° C., in a vacuum oven for six hours. Polymerization conditions and polymer properties are shown in Table 2 below. See also Table 3 The interpolymers AR1-AR12, in Tables 2 and 3, are each representative of a vinylarene-rich (hard block) segment of an ethylene/octene/styrene multiblock interpolymer, in, for example, monomer composition, tacticity of the polymerized vinylarene, $T_m$ and $T_g$.

TABLE 2

CAT B Batch Reactor Conditions and GPC/DSC Characterizations

| | Reactor | | | | | | GPC | | | DSC | | |
|---|---|---|---|---|---|---|---|---|---|---|---|---|
| Sample | Initial C2, g | Sty, g | C8, g | Tol, g | Yield | Efficiency (g poly/g metal) | $M_w$ g/mol | $M_n$ g/mol | PDI | $T_g$ ° C. | $\Delta H_m$ (J/g) | $T_m$ ° C. |
| AR1 | 10.4 | 52 | 22 | 230 | 6.2 | 19987 | 174,258 | 21,626 | 8.06 | 30 | 1.85 | 124 |
| AR2 | 10.5 | 94 | 34 | 177 | 0.4 | 1290 | 81,351 | 7,971 | 10.21 | none | | |
| AR3 | 7 | 125 | 67 | 112 | 1 | 2418 | 91,609 | 5,322 | 17.21 | 96 | 1.16 | 233 |
| AR4 | 6 | 125 | 39 | 148 | 5.4 | 1662 | 119,811 | 11,461 | 10.45 | 103 | 4.91 | 241 |
| AR5 | 5.1 | 123 | 17 | 179 | 18 | 29014 | 390,569 | 15,255 | 25.60 | 92 | 9.5 | 241 |
| AR6 | 10.3 | 77 | 50 | 173 | 0.282 | 682 | 76,315 | 4,080 | 18.71 | 93 | 0.55 | 233 |
| AR7 | 10.4 | 62 | 11 | 234 | 3 | 7253 | 111,994 | 9,702 | 11.54 | 33 | 0.58 | 129 |
| AR8 | 10.4 | 109 | 17 | 184 | 1.4 | 3023 | 79,125 | 10,209 | 7.75 | 102 | 0.56 | 218 |
| AR9 | 5.9 | 88 | 76 | 138 | 0.335 | 723 | 73,127 | 7,757 | 9.43 | 92 | | |
| AR10 | 12.6 | 47 | 10 | 246 | 0.472 | 1522 | 73,583 | 9,894 | 7.44 | 3 | 2.25 | 128 |
| AR11 | 11.6 | 69 | 75 | 148 | 0.342 | 739 | 51,343 | 9,313 | 5.51 | 96 | | |
| AR12 | 10.3 | 31 | 17 | 257 | 25 | 6045 | 111,584 | 23,225 | 4.80 | 6 | 2.47 | .26 |

General: Catalyst = 22 μmol [CAT B], 1.2 x "amines, bis(hydrogenated tallow alkyl)methyl, tetrakis(pentafluorophenyD)borate(1-)," 10x MMAO, T = 120° C., t = 10 min, V = 600 mL

TABLE 3

Polymer Characterization[a] (Cp*Sc Polymers, Syndiotactic PS (100 mol %)

| Sample | Styrene, mol % | Octene, mol % | Ethylene, mol % |
|---|---|---|---|
| AR1 | 41.9 | 0 | 58.1 |
| AR2 | 78.8 | 0 | 21.2 |
| AR3 | 89.8 | 0 | 10.2 |
| AR4 | 90.7 | 0 | 9.3 |
| AR5 | 88.7 | 0 | 11.3 |
| AR6 | 82.3 | 0 | 17.7 |
| AR7 | 50.6 | 0 | 49.4 |
| AR8 | 77.4 | 0 | 22.6 |
| AR9 | 85.7 | 0 | 14.3 |
| AR10 | 33.3 | 0 | 66.7 |
| AR11 | 60 | 0 | 40 |
| AR12 | 27.7 | 0 | 72.3 |

[a]Each mol % based on the total moles of polymerized monomers in the interpolymer (represents a vinylarene-rich segment (Hard Block)).

Additional Studies—CAT B

Figure 4:
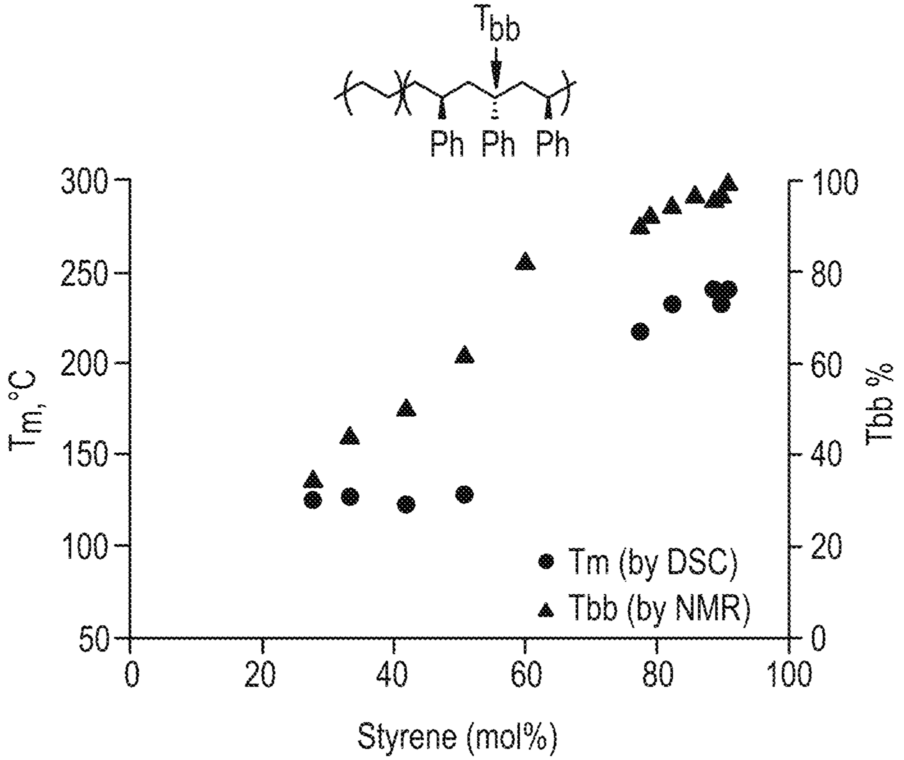
FIG. 4 depicts $T_m$ (from DSC) and the mole percentage of "back to back styrene incorporation" or $T_{bb}$ (as determined by $^{13}C$ NMR), each as a function of the mole percentage of polymerized (or incorporated) styrene (as determined by $^{13}C$ NMR).

FIG. 4 depicts $T_m$ (from DSC measurements) and the mole percentage of "back to back styrene incorporation" or $T_{bb}$ (as determined by $^{13}C$ NMR), each as a function of the mole percentage of polymerized (or incorporated) styrene (as determined by $^{13}C$ NMR). As seen in this figure, as the amount of ethylene (C2) incorporation increases, the Tm of the sPS decreases below the $T_m$ of pure sPS (270° C.), and the mole percentage of $T_{bb}$ also decreases. Samples include the batch reactor samples of Tables 2 and 3.

Figure 5:
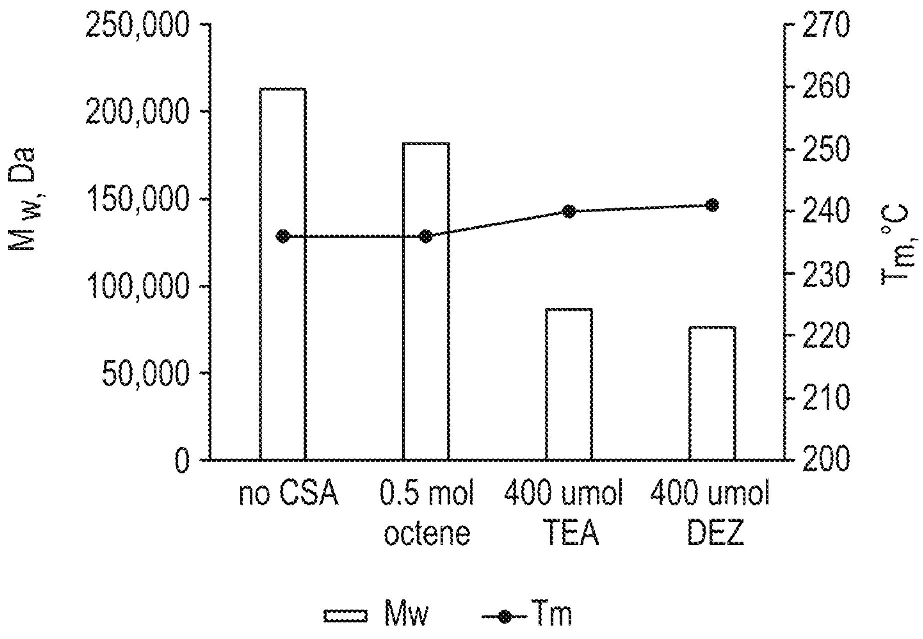
FIG. 5 depicts the weight average molecular weight ($M_w$) (from GPC) and the $T_m$ (from DSC), each as a function of the noted polymerization parameters.

FIG. 5 depicts the weight average molecular weight ($M_w$) (from GPC) and the $T_m$ (from DSC), each as a function of the noted polymerization parameters. As seen in this figure, the presence of the chain shuttling agents results in a decrease in molecular weight and $T_m$, indicating the presence of chain shuttling in the reaction mixture. Also, the presence of 1-octene did not significantly impact molecular weight or $T_m$. Samples were prepared in accordance with the above batch polymerization, and using the conditions shown in Table 4.

TABLE 4

Batch Reactor Conditions for Samples in FIG. 5

| CSA | Initial C2, g | Sty, g | C8, g |
|---|---|---|---|
| None | 2.6 | 60.0 | 0 |
| None | 2.6 | 60.0 | 60.0 |
| TEA | 2.6 | 60.0 | 0 |
| DEZ | 2.6 | 60.0 | 0 |

General: 22 μmol [CAT B], 1.2 x "amines, bis(hydrogenated tallow alkyl)methyl, tetrakis(pentafluorophenyl)-borate(1−)," 10x MMAO, T = 120° C., t = 10 min, V = 600 mL The data from Study 1 demonstrate the desirable copolymerization characteristics that the scandium catalyst, CAT B, has for the intended chain shuttling polymerization, which requires this catalyst to make a polystyrene or poly (styrene-co-ethylene) with a high melting temperature, in presence of an alpha-olefin, such as 1-octene. For this scheme to be successful, the catalyst should desirably have a high reactivity towards styrene, but a very low reactivity toward the alpha-olefin. The above tables and figures show a high reactivity for styrene and ethylene, but very low reactivity toward 1-octene. Additionally, the desirable chain shuttling characteristics are maintained, as evidenced by the reduction in molecular weight for polymerizations conducted in presence of DEZ or TEA.

Study 2: Vinylarene-Poor (Soft Block) Analysis

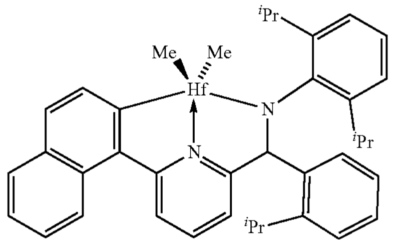

CAT A (See WO03/40195, WO04/24740 and U.S. Pat. No. 8,501,885)

Ethylene, 1-Octene, Styrene Polymerization: Reactivity of CAT A

See above discussion on the batch reactor set-up. Degassed, anhydrous toluene was added to the 600 mL Parr reactor from a solvent cylinder pressurized with nitrogen using a mass flow meter, and the reactor agitator was set to 450 rpm. Styrene was injected via a cylinder pressurized with high pressure nitrogen. A preset amount of 1-octene was added to the reactor from a cylinder pressurized with nitrogen, using a flow meter. Once the reactor reached the starting temperature set point of 120° C., a preset amount of ethylene was added to the reactor using a flow meter, followed by the addition of the active catalyst solution. The catalyst solution was prepared by adding a pre-made toluene solution of CAT A catalyst, 0.006 M solution of "amines, bis(hydrogenated tallow alkyl)methyl, tetrakis(pentafluoro-phenyl)-borate(1-)" activator in toluene (1.0-1.2 equiv), and a 0.05 M solution of MMAO-3A in toluene (10 equiv.). Each "equiv" is relative to one equiv. of CAT A.

The flow of ethylene, at 200 mg/min, was initiated, while the overall reactor pressure was controlled at the programmed setpoint throughout the desired run time of ten minutes. Following the mixing time, the agitator was stopped, and the contents of reactor were emptied into the dump pot. The pot contents were poured into methanol, and the mixture stirred. The polymer precipitate was filtered and dried at 130° C. in a vacuum oven for six hours. Polymerization conditions and polymer properties are shown in Table 5 below. See also Table 6. The interpolymers AP1-AP11, in Tables 5 and 6, are each representative of a vinylarene-poor (Soft Block) segment of an ethylene/octene/styrene multiblock interpolymer, in, for example, monomer composition, tacticity of the polymerized vinylarene, $T_m$ and $T_g$.

TABLE 6-continued

Polymer Characterization ($^{13}$C NMR)

| Sample | Styrene, mol %[a] | Octene, mol %[a] | Ethylene, mol %[a] |
|---|---|---|---|
| AP7 | 5.3 | 8.8 | 85.9 |
| AP8 | 5.4 | 31.7 | 62.9 |
| AP9 | 3.1 | 6.9 | 90 |
| AP10 | 3.7 | 26.9 | 69.4 |
| AP11 | 2.2 | 13.3 | 84.5 |

Note:

Values of mol % styrene in the table were calculated to include only styrene present in a E/O/S terpolymer with the assumption that no back-to-back styrene was present. This is based on the observation that CAT A does not polymerize styrene under homopolymerization conditions. Any atactic polystyrene was assumed to arise from thermally-generated PS.

[a]Each mol % based on the total moles of polymerized monomers in the interpolymer (represents a vinylarene-poor segment (Soft Block)).

Additional Studies—CAT A

Figure 6:
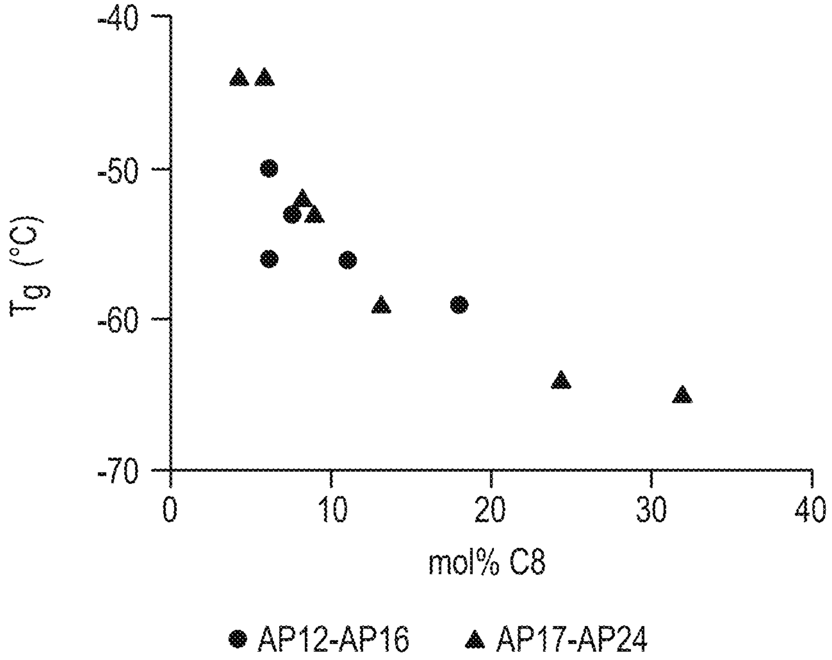
FIG. 6 depicts glass transition temperature ($T_g$), from DSC, as a function of mole percentage of polymerized octene in the polymer (as determined from $^{13}C$ NMR).

FIG. 6 depicts glass transition temperature ($T_g$), from DSC, as a function of mole percentage of polymerized octene in the polymer (as determined from $^{13}$C NMR). As seen from this figure and Table 7 below, the presence of styrene in reactor does not have large impact on the glass transition temperature and the amorphous phase of the final polymer. Samples were prepared in accordance with the above batch polymerization (see Table 5), and using the conditions shown in Table 7.

TABLE 5

CAT A Batch Reactor Conditions and GPC/DSC Characterization

| | Reactor | | | | | | GPC | | | DSC | | |
|---|---|---|---|---|---|---|---|---|---|---|---|---|
| Sample | Initial C2, g | Sty, g | C8, g | Tol, g | Yield | Efficiency (g poly/g metal) | $M_w$ g/mol | $M_n$ g/mol | PDI | $T_g$ ° C. | $\Delta H_m$ (J/g) | $T_m$ ° C. |
| AP1 | 10.4 | 52 | 22 | 230 | 12 | 5378 | 635,434 | 101,824 | 6.24 | −53 | 14.44 | 73 |
| AP2 | 10.5 | 94 | 34 | 177 | 1 | 448 | 174,013 | 60,691 | 2.87 | −48,105 | | none |
| AP3 | 7 | 125 | 67 | 112 | 4 | 1793 | 229,859 | 79,968 | 2.87 | −56 | | none |
| AP4 | 5.1 | 123 | 17 | 179 | 4.3 | 1927 | 563,851 | 179,471 | 3.14 | none | | |
| AP5 | 10.3 | 77 | 50 | 173 | 6.8 | 3048 | 1,117,020 | 221,692 | 5.04 | none | | |
| AP6 | 10.4 | 62 | 11 | 234 | 1 | 448 | 235,551 | 71,309 | 3.30 | 96.3 | | |
| AP7 | 10.4 | 109 | 17 | 184 | 12.6 | 5647 | 401,300 | 28,850 | 13.91 | −47 | 5.79 | 78 |
| AP8 | 5.9 | 88 | 76 | 138 | 13 | 5827 | 508,680 | 124,594 | 4.08 | −61 | | none |
| AP9 | 12.6 | 47 | 10 | 246 | 12 | 5378 | 362,481 | 96,701 | 3.75 | −49 | 17.9 | 100.75 |
| AP10 | 11.6 | 69 | 75 | 148 | 19 | 8516 | 698,512 | 144,256 | 4.84 | −62 | | none |
| AP11 | 10.3 | 31 | 17 | 257 | 13 | 5827 | 369,706 | 84,713 | 4.36 | −57 | 11.26 | 86.07 |

General: Catalyst = 6-8 μmol CAT A, 1.2 x "amines, bis(hydrogenated tallow alkyl)methyl, tetrakis(pentafluorophenyl)borate(1-)," 10x MMAO, T = 120° C., t = 10 min, V = 600 mL

TABLE 6

Polymer Characterization ($^{13}$C NMR)

| Sample | Styrene, mol %[a] | Octene, mol %[a] | Ethylene, mol %[a] |
|---|---|---|---|
| AP1 | 3.0 | 11.8 | 85.3 |
| AP2 | 1.2 | 10.5 | 88.2 |
| AP3 | 2.7 | 18.8 | 78.5 |
| AP4 | 4.7 | 7.8 | 87.5 |
| AP5 | 2.7 | 14.3 | 83.1 |
| AP6 | 4.3 | 4.6 | 91.1 |

TABLE 7

Batch Reactor Conditions for Samples in FIG. 6

| | Initial C2, g | Sty, g | C8, g |
|---|---|---|---|
| AP12 | 13.4 | 0 | 10.0 |
| AP13 | 13.4 | 0 | 20.0 |
| AP14 | 13.4 | 0 | 30.0 |
| AP15 | 13.4 | 0 | 40.0 |
| AP16 | 13.4 | 0 | 60.0 |
| AP17 | 13.4 | 60 | 10.0 |

TABLE 7-continued

Batch Reactor Conditions for Samples in FIG. 6

| | Initial C2, g | Sty, g | C8, g |
|---|---|---|---|
| AP18 | 13.4 | 60 | 20.0 |
| AP19 | 13.4 | 60 | 30.0 |
| AP20 | 13.4 | 60 | 40.0 |
| AP21 | 13.4 | 60 | 50.0 |
| AP22 | 10.5 | 62 | 67 |
| AP23 | 10.5 | 31 | 101 |
| AP24 | 10.4 | 16 | 34 |

General: Catalyst = 6-8 μmol CAT A, 1.2 x "amines, bis(hydrogenated tallow alkyl)methyl, tetrakis(pentafluorophenyl)borate(1−)," 10x MMAO, T = 120° C., t = 10 min, V = 600 mL The data from Study 2 demonstrate desirable copolymerization characteristics for the hafnium catalyst (CAT A) for the intended chain shuttling polymerization. Unlike the scandium catalyst (CAT B), this catalyst species is required to make a polyethylene or poly(ethylene-co-1-octene) with little styrene incorporation. The catalyst should desirably have a high reactivity with ethylene and the alpha-olefin, and a low reactivity toward styrene. The above tables and figures reveal a high reactivity for ethylene and 1-octene, but low reactivity toward styrene. This is also evident by the low styrene incorporation into the polymer, as determined by NMR. Additionally, styrene could increase the $T_g$ of the polymer, which would be detrimental to performance in elastomeric applications, but little, to no, increase in $T_g$ was observed in the polymer product. Also, a reduction in molecular weight was observed in the presence of TEA and CAT A, indicating chain shuttling.

Figure 7:
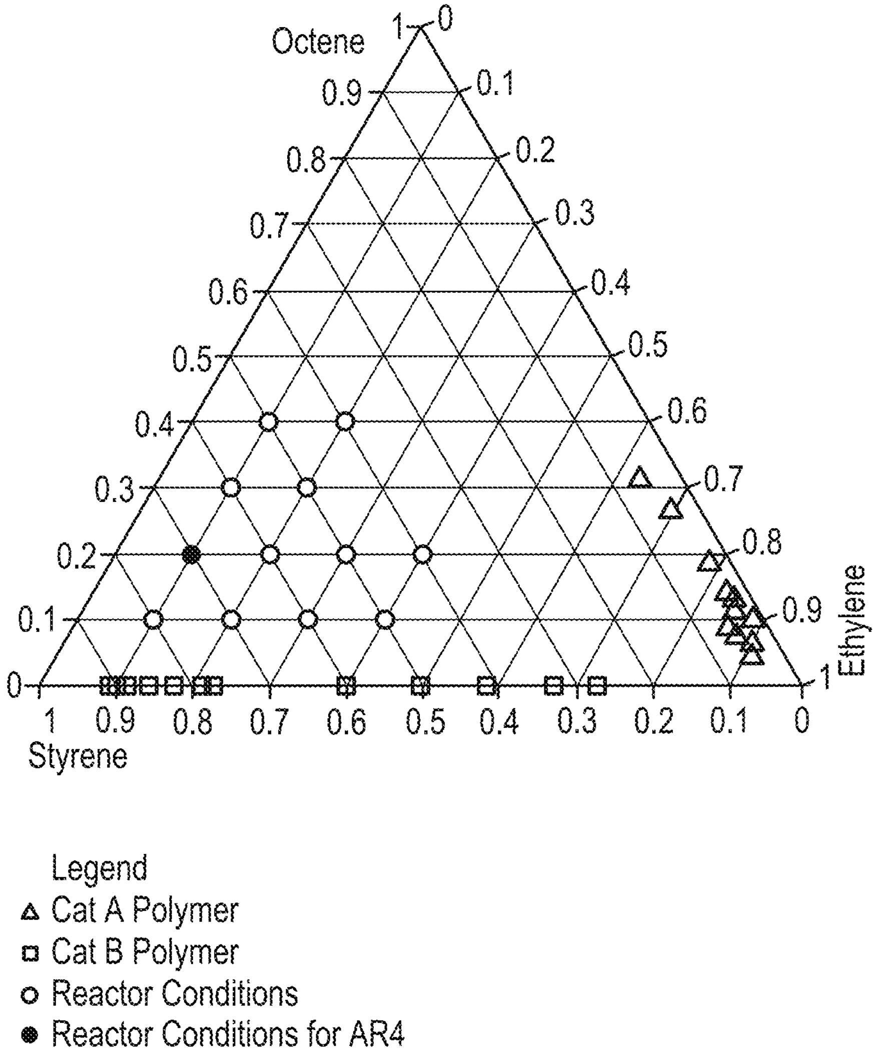
FIG. 7 depicts reactor conditions (mol % ethylene, mol % styrene and mol % octene) and the corresponding mole percentage of ethylene, styrene and octene in the final polymer (as determined by $^{13}C$ NMR spectroscopy) made under terpolymerization conditions (CAT B and CAT A).

FIG. 7 depicts reactor conditions (mol % ethylene, mol % styrene and mol % octene, each as determined by VLE calculations, open circles) and the corresponding mole percentage of ethylene, styrene and octene in the final polymer (each as determined by 13C NMR spectroscopy, square and triangle shapes made under terpolymerization conditions. This figure demonstrates the hypothetical orthogonal polymerization behavior of CAT A and CAT B. Samples were the polymerization examples of Table 2 and Table 5.

Study 3: Multiblock Interpolymer Analysis—Dual Catalysts and Chain Shuttling

Batch Reactor Polymerization Set-Up

The dual catalyst polymerizations were conducted in a 600 mL Parr batch reactor. The reactor was heated by electrical heating bands, and cooled by an internal cooling coil. Both the reactor and the heating/cooling system were controlled and monitored by a process computer. The bottom of the reactor was fitted with a dump valve, which emptied the reactor contents into a glass dump pot. The dump pot had a constant N2 purge, and was vented to a dump pot. The ethylene used for each polymerization was run through a purification column consisting of Q5 and 3A molecular sieves to remove any oxygen and water. The anhydrous-grade toluene, from Acros Organics, was sparged in the hood with nitrogen, and transferred to the glovebox. Molecular sieve was added to the toluene to remove water from the solvent. High pressure nitrogen was ultra-high purity grade supplied by Airgas or another vendor. Styrene, obtained from Sigma Aldrich, was degassed and passed through neutral alumina to remove inhibitor, just prior to use.

Toluene, ethylene, styrene, and optionally, the octene, were added to the reactor. Toluene was added to a one liter, stainless steel cylinder, inside a glovebox, and then added to the reactor using the high pressure nitrogen. A pre-injection of CSA (e.g., TEA or DEZ) was added, along with toluene, prior to heating up the reactor and filling the reactor with the solvent. Two control polymerizations did not have a preinjection of CSA. After the toluene was added, the reactor agitator was operated at 1000 rpm, while the reactor was heated to 120° C. When the reactor reached this temperature set point, the desired amount of ethylene was added to the reactor, using a flow meter. Ethylene was added throughout the reaction, in order to maintain the reaction pressure set point.

Two catalyst cocktails were prepared by mixing the scavenger, activator, and the respective catalyst in toluene, inside the inert ($N_2$) glovebox. The scavenger, activator(s), and catalysts were mixed with the appropriate amount of toluene, to achieve the desired molarity solution. Each cocktail was drawn into a syringe, and the syringe was emptied into a 20 mL, glass vial with a rubber septum cap, and under $N_2$ atmosphere (to maintain an inert atmosphere over the cocktail, during transfer from the glovebox to the reactor). The contents of the vial were transferred into a catalyst shot tank outside of the glovebox. The reactor was ready to run, after it reached its target temperature set point of 120° C., and both the pressure and the temperature reached steady state. The "catalyst cocktail" was injected into the injector, with a constant low pressure nitrogen purge to avoid contamination. The run timer was started on the control system, and the "catalyst cocktail" was immediately injected into the reactor, while the agitator ran at 1000 rpm. The two different catalyst cocktails were injected at the same time. Within the first minute of a successful polymerization, an exotherm was observed, as well as decrease in the reactor pressure. As discussed above, ethylene was added by utilizing a pressure controller to maintain the reactor pressure set point. The reactor ran for the specified amount of time, typically ten minutes. Prior to dumping the polymer at the end of the run, the reactor dump pot was filled with 300 mL methanol (in a fume hood) to precipitate any polymer formed (if there was a high styrene load, no methanol was added). A poly lid for the dump pot was used to avoid fumes, when transferring the pot from the hood to the reactor. The polymer was dumped into the methanol inside the dump pot. The precipitated polymer was collected by filtration, and transferred to a labeled MYLAR trays. The polymer sample remained in a fume hood, where the residual solvent was evaporated overnight. The reactor was then filled with toluene solvent, and hot washed at 180-190° C. to ensure a clean reactor, to avoid cross-contamination for subsequent polymerizations. The trays containing the polymer product were transferred to a vacuum oven, where they were heated up to 100° C., under vacuum for several hours, to remove any remaining solvent. After the trays cooled to ambient temperature, the polymer product was weighed for yield/efficiencies, and submitted for polymer testing. Polymerization conditions are shown in Table 8. MB-1 through MB-8 are each a composition containing a multiblock interpolymer. Composition properties are shown in Table 9.

TABLE 8

Polymerization Conditions for Compositions containing an Ethylene/Octene/Styrene Multiblock Terpolymer

| | CSA | Catalyst | Time, min | Amt. CAT A Amt. CAT B | Temp, ° C. | C2 initial loading, g | Octene, g | Styrene, g | Toluene, g |
|---|---|---|---|---|---|---|---|---|---|
| MB-1 | 100 umol TEA | CAT A and CAT B | 10 | 1.5 μmol CAT A 6.5 μmol CAT B | 120 | 8.1 | 61 | 60 | 175 |
| MB-2 | 400 umol TEA | CAT A and CAT B | 10 | 2.0 μmol CAT A 6.5 μmol CAT B | 120 | 8.1 | 61 | 60 | 175 |
| MB-3 | 100 umol DEZ | CAT A and CAT B | 10 | 1.8 μmol CAT A 6.5 μmol CAT B | 120 | 8.1 | 61 | 60 | 175 |
| MB-4 | 400 umol DEZ | CAT A and CAT B | 10 | 1.8 μmol CAT A 6.5 μmol CAT B | 120 | 8.1 | 61 | 60 | 175 |
| MB-5 | 100 umol TEA | CAT A and CAT B | 10 | 1.8 μmol CAT A 6.5 μmol CAT B | 120 | 2.6 | 60 | 60 | 122 |
| MB-6 | 400 umol TEA | CAT A and CAT B | 10 | 1.8 μmol CAT A 6.5 μmol CAT B | 120 | 2.6 | 60 | 60 | 122 |
| MB-7 | 100 umol DEZ | CAT A and CAT B | 10 | 1.8 μmol CAT A 6.5 μmol CAT B | 120 | 2.6 | 60 | 60 | 122 |
| MB-8 | 400 umol DEZ | CAT A and CAT B | 10 | 1.8 μmol CAT A 6.5 μmol CAT B | 120 | 2.6 | 60 | 60 | 122 |
| IB-1 | None | CAT A and CAT B | 10 | 2.0 μmol CAT A 6.5 μmol CAT B | 120 | 8.1 | 61 | 60 | 175 |
| IB-2 | None | CAT A and CAT B | 10 | 2.2 μmol CAT A 6.5 μmol CAT B | 120 | 2.6 | 60 | 60 | 122 |

Reactor Volume = 600 mL, 1.2 x "amines, bis(hydrogenated tallow alkyl)methyl, tetrakis(pentafluorophenyl)-borate(1-)," activation for both catalysts, 10-x MMAO scavenger. IB-1 and IB-2 are each a in-reactor blend.

TABLE 9

Composition Properties

| | GPC | | | $^{13}$C NMR* | | | DSC | | $^{13}$C NMR |
|---|---|---|---|---|---|---|---|---|---|
| Run | $M_w$ g/mol | $M_n$ g/mol | PDI (MWD) | mol % C2 | mol % C8 | mol % Sty | $T_g$, ° C. | $T_m$, ° C. | Ratio of block styrene to isolated styrene |
| MB-1 | 46,686 | 18,270 | 2.56 | | | | 6.3 | 127 | |
| MB-2 | 145,602 | 40,955 | 3.56 | 41.2 | 30.5 | 28.3 | −64 | 255 | 21.6 |
| MB-3 | | | | 67.1 | 17.8 | 15 | −62 | none | |
| MB-4 | | | | | | | −63 | | |
| MB-5 | 182,482 | 50,922 | 3.58 | | | | −59 | 254 | |
| MB-6 | 100,816 | 31,843 | 3.17 | | | | −59 | 261 | |
| MB-7 | 147,220 | 40,633 | 3.62 | | | | −60 | 256 | |
| MB-8 | 80,636 | 20,323 | 3.97 | 27.4 | 29.7 | 42.9 | −62 | 254 | |
| IB-1 | 477,805 | 92,261 | 5.18 | 56.7 | 26.6 | 16.8 | −62 | 250 | 9.6 |
| IB-2 | 471,850 | 113,671 | 4.15 | | | | −62 | 242 | |

*Each mol % based on the total moles of polymerized monomers in the composition.

The invention claimed is:

1. A composition comprising an ethylene/vinylarene multiblock interpolymer, said interpolymer comprising at least one polymer structure selected from Structure 1 or Structure 2, each as shown below, and where (AR) refers to a vinylarene rich segment and (AP) refers to a vinylarene poor segment:

-(AR)-(AP)-(AR)-(AP)- (Structure 1), (AR)-(AP)-(AR)-(AP) (Structure 2), wherein each (AR) segment independently comprises, in polymerized form, ethylene, the vinylarene and optionally an alpha-olefin; and wherein each (AP) segment independently comprises, in polymerized form, ethylene, optionally the vinylarene and optionally the alpha-olefin; and wherein each (AR) segment independently comprises, in polymerized form, >10 mol % of the vinylarene, based on the total moles of polymerized monomers in the (AR) segment; and wherein each (AP) segment independently comprises, in polymerized form, ≤10 mol % of the vinylarene, based on the total moles of polymerized monomers in the (AP) segment.

2. The composition of claim 1, wherein, for the ethylene/vinylarene multiblock interpolymer, each (AR) segment independently comprises, in polymerized form, from 15 mol % to <100 mol % of the vinylarene, based on the total moles of polymerized monomers in the (AR) segment.

3. The composition of claim 1, wherein, for the ethylene/vinylarene multiblock interpolymer, each (AR) segment independently comprises, in polymerized form, from 2 mol % to 80 mol % of the ethylene, based on the total moles of polymerized monomers in the (AR) segment.

4. The composition of claim 1, wherein, for the ethylene/vinylarene multiblock interpolymer, each (AR) segment independently comprises from 20 mol % to 100 mol % of the polymerized vinylarene in a "back to back" configuration, as shown below in subsegment bb:

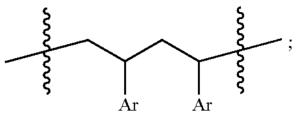

(subsegment bb)

and wherein the mol % is based on the total moles of polymerized vinylarene in the (AR) segment.

5. The composition of claim 1, wherein, for the ethylene/vinylarene multiblock interpolymer, each (AR) segment independently comprises from 20 mol % to 100 mol % of the polymerized vinylarene in a syndiotactic "back to back" configuration, as shown below in subsegment sbb:

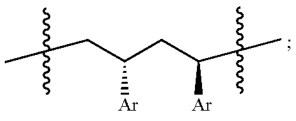

(subsegment sbb)

and wherein the mol % is based on the total moles of polymerized vinylarene in the (AR) segment.

6. The composition of claim 1, wherein composition further comprises a polyethylene homopolymer, an ethylene/vinylarene copolymer, an ethylene/alpha-olefin copolymer, or a combination thereof.

7. An article comprising at least one component formed from the composition of claim 1.

* * * * *